(12) United States Patent
Matsumura et al.

(10) Patent No.: US 12,509,507 B2
(45) Date of Patent: Dec. 30, 2025

(54) FUSION PROTEIN SUITABLE FOR DISSOLVING FIBRIN CLOT, AND PHARMACEUTICAL COMPOSITION CONTAINING SAID FUSION PROTEIN

(71) Applicants: NATIONAL CANCER CENTER, Tokyo (JP); RIN INSTITUTE INC., Tokyo (JP)

(72) Inventors: Yasuhiro Matsumura, Chiba (JP); Shingo Hanaoka, Chiba (JP); Shinji Saijo, Chiba (JP)

(73) Assignees: NATIONAL CANCER CENTER, Tokyo (JP); RIN INSTITUTE INC., Tokyo (JP)

( * ) Notice: Subject to any disclaimer, the term of this patent is extended or adjusted under 35 U.S.C. 154(b) by 643 days.

(21) Appl. No.: 17/915,905

(22) PCT Filed: Mar. 30, 2021

(86) PCT No.: PCT/JP2021/013496
§ 371 (c)(1),
(2) Date: Sep. 29, 2022

(87) PCT Pub. No.: WO2021/200922
PCT Pub. Date: Oct. 7, 2021

(65) Prior Publication Data
US 2024/0218058 A1 Jul. 4, 2024

(30) Foreign Application Priority Data
Mar. 31, 2020 (JP) .................. 2020-062316

(51) Int. Cl.
*C07K 16/18* (2006.01)
*A61P 9/10* (2006.01)
(Continued)

(52) U.S. Cl.
CPC .......... *C07K 16/18* (2013.01); *A61P 9/10* (2018.01); *C12N 9/6462* (2013.01); *A61K 38/00* (2013.01);
(Continued)

(58) Field of Classification Search
None
See application file for complete search history.

(56) References Cited

U.S. PATENT DOCUMENTS 5,204,255 A 4/1993 Tagawa et al.
5,571,708 A 11/1996 Yang et al.
(Continued)

FOREIGN PATENT DOCUMENTS

CN 101155916 A 4/2008
EP 0210279 A1 2/1987
(Continued)

OTHER PUBLICATIONS

Extended European Search Report dated May 15, 2024, for European Patent Application No. 21780469.9, Matsumura et al., "Fusion Protein Suitable for Dissolving Fibrin Clot, and Pharmaceutical Composition Containing Said Fusion Protein," filed Mar. 30, 2021 (10 pages).
(Continued)

*Primary Examiner* — Aurora M Fontainhas
(74) *Attorney, Agent, or Firm* — Clark & Elbing LLP

(57) ABSTRACT

The present invention provides a fusion protein suitable for dissolving a fibrin clot and a pharmaceutical composition containing the fusion protein. According to the present invention, there is provided a fusion protein of an antibody that binds to insoluble fibrin or an antigen-binding fragment thereof and a prourokinase mutant, in which amino acid sequence of a plasmin in a kringle domain is modified so as
(Continued)

to be less cleavable with a plasmin, and a pharmaceutical composition containing the fusion protein.

9 Claims, 7 Drawing Sheets

Specification includes a Sequence Listing.

(51) Int. Cl.
*C12N 9/72* (2006.01)
*A61K 38/00* (2006.01)

(52) U.S. Cl.
CPC .... *C07K 2317/565* (2013.01); *C07K 2319/50* (2013.01)

(56) References Cited

U.S. PATENT DOCUMENTS

| | | |
|---|---|---|
| 2009/0286721 A1 | 11/2009 | Pan et al. |
| 2016/0011217 A1 | 1/2016 | Matsumura et al. |
| 2020/0147231 A1 | 5/2020 | Matsumura et al. |

FOREIGN PATENT DOCUMENTS

| | | |
|---|---|---|
| EP | 0478366 A2 | 4/1992 |
| WO | WO-2014/133093 A1 | 9/2014 |
| WO | WO-2018/203517 A1 | 11/2018 |

OTHER PUBLICATIONS

Hanaoka et al., "A novel and potent thrombolytic fusion protein consisting of anti-soluble fibrin antibody and mutated urokinase," bioRxiv preprint. (Sep. 2020) (35 pages).

Runge et al., "A recombinant chimeric plasminogen activator with high affinity for fibrin has increased thrombolytic potency in vitro and in vivo," Proc Natl Acad Sci U S A. 88(22):10337-41 (Nov. 1991).

International Search Report mailed May 25, 2021, for PCT International Application No. PCT/JP2021/013496, Matsumura et al., "Fusion Protein Suitable for Dissolving Fibrin Clot, and Pharmaceutical Composition Containing said Fusion Protein," filed Mar. 30, 2021 (3 pages).

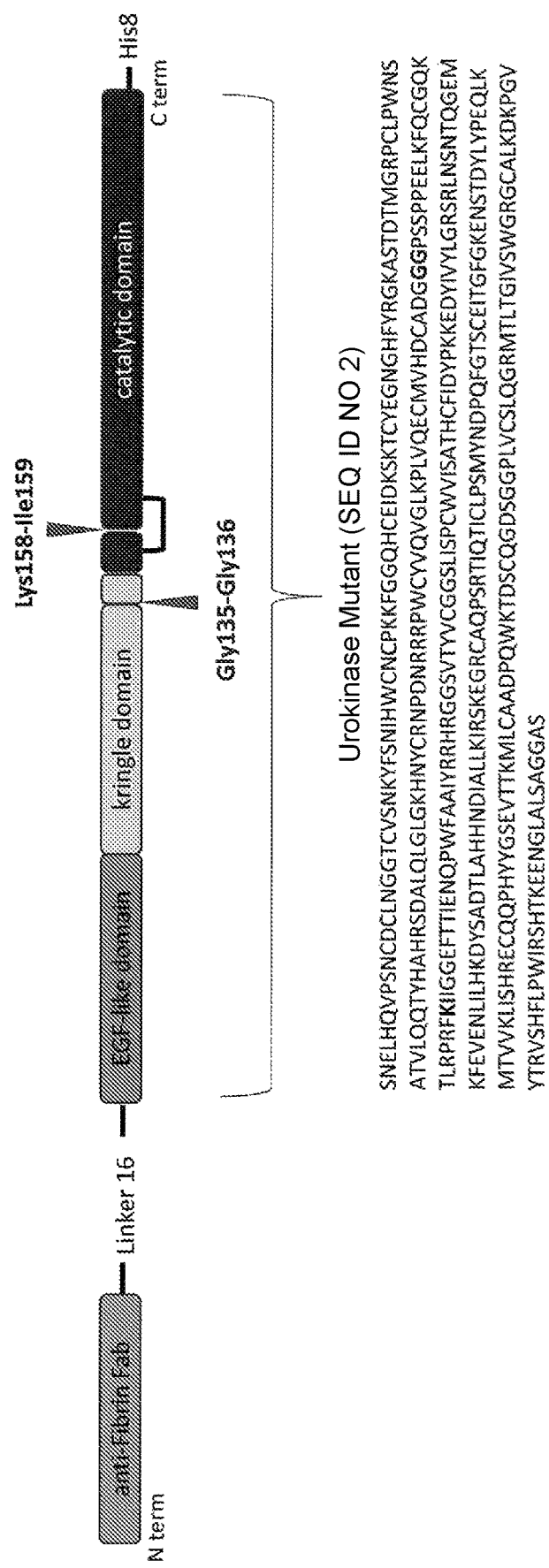

Plasminogen level in blood after administration of drugs

Recanalization time of blood vessel (%)

† indicates having a significant difference from negative control (p<0.05; Aspin-Welch t-test)

** indicates having a significant difference from negative control (p<0.01; Student's t-test)

Arrow indicates blood clot site

Humanized 1101 antibody 0.5 μg/ml

Humanized 1101 antibody 0.2 μg/ml

Humanized 99 antibody 0.5 μg/ml

Humanized 99 antibody 0.2 μg/ml

FUSION PROTEIN SUITABLE FOR DISSOLVING FIBRIN CLOT, AND PHARMACEUTICAL COMPOSITION CONTAINING SAID FUSION PROTEIN

SEQUENCE LISTING

The instant application contains a Sequence Listing which has been submitted electronically in ASCII format and is hereby incorporated by reference in its entirety. Said ASCII copy, created on Sep. 26, 2022, is named 51021-019001_Sequence_Listing_9_26_22_ST25 and is 20,975 bytes in size.

TECHNICAL FIELD

The present invention relates to a fusion protein suitable for dissolving fibrin clots and a pharmaceutical composition containing the fusion protein.

BACKGROUND ART

In the field of development for thrombosis therapy, methods of administering a drug dissolving blood clots formed in the blood vessel to a patient have been developed. The blood clot formed can be decomposed into a fibrin degradation product by plasmin. A thrombolytic drug converts plasminogen into plasmin, thereby promoting dissolution of blood clots.

Examples of the thrombolytic drug includes a tissue-type plasminogen activator (t-PA) and a urokinase-type plasminogen activator (u-PA). Activation of plasminogen by t-PA (in other words, promoting production of plasmin from plasminogen) is greatly enhanced in the presence of fibrin. In contrast, u-PA has a low binding specificity to fibrin and administration of u-PA promotes systemic fibrinolysis. Because of this, there is a concern for the risk that a hemorrhagic complication may develop. For the reason, t-PA is more preferably used for treating thrombosis rather than u-PA.

Antibodies binding to fibrin with a stronger affinity than to fibrinogen have been developed (Patent Literatures 1 and 2). These Patent Literatures disclose that the antibodies are used for treating cancer.

CITATION LIST

Patent Literatures

Patent Literature 1: WO2014/133093
Patent Literature 2: WO2018/203517

SUMMARY OF INVENTION

The present invention provides a fusion protein suitable for dissolving a fibrin clot and a pharmaceutical composition containing the fusion protein.

According to the present invention, the following inventions are provided.

[1] A fusion protein of an antibody that binds to insoluble fibrin or an antigen-binding fragment thereof and a prourokinase mutant, wherein
the prourokinase mutant is a modified mutant having a kringle domain and a catalytic domain, wherein the amino acid sequence of a plasmin cleavage site in the kringle domain is modified such that the cleavage site is more resistant to plasmin cleavage (for example, a plasmin cleavage resistant mutant having a destroyed plasmin cleavage site).

[2] The fusion protein according to the above [1], wherein the prourokinase mutant further has an EGF-like domain.

[3] The fusion protein according to the above [1] or [2], wherein the prourokinase mutant has an amino acid sequence having a sequence identity of 90% or more to the amino acid sequence represented by SEQ ID NO:2.

[4] The fusion protein according to any one of the above [1] to [3], wherein the antibody that binds to insoluble fibrin or an antigen-binding fragment thereof binds to a peptide consisting of the amino acid sequence represented by SEQ ID NO:17 or 18 and insoluble fibrin.

[5] The fusion protein according to any one of the above [1] to [4], wherein the insoluble fibrin antibody or an antigen-binding fragment thereof comprises:
a heavy chain variable region containing heavy chain CDR1 having the amino acid sequence represented by SEQ ID NO:11, heavy chain CDR2 having the amino acid sequence represented by SEQ ID NO:12 and heavy chain CDR3 having the amino acid sequence represented by SEQ ID NO:13; and
a light chain variable region containing light chain CDR1 having the amino acid sequence represented by SEQ ID NO:14, light chain CDR2 having the amino acid sequence represented by SEQ ID NO:15 and light chain CDR3 having the amino acid sequence represented by SEQ ID NO:16.

[6] A pharmaceutical composition comprising the fusion protein according to any one of the above [1] to [5].

[7] The pharmaceutical composition according to the above [6], for use in dissolving a fibrin clot.

[8] The pharmaceutical composition according to the above [6] or [7], which is a thrombolytic agent or a fibrinolytic enzyme agent.

[9] The pharmaceutical composition according to any one of the above [6] to [8], for use in treating a disease selected from cerebrovascular disorder and myocardial infarction.

(1) A fusion protein of a heavy chain of an antibody that binds to insoluble fibrin or an antigen-binding fragment thereof and a prourokinase mutant, wherein the prourokinase mutant is a modified mutant having a kringle domain and a catalytic domain, wherein the amino acid sequence of a plasmin cleavage site in the kringle domain is modified such that the cleavage site is more resistant to plasmin cleavage (for example, a plasmin cleavage resistant mutant having a destroyed plasmin cleavage site).

(2) The fusion protein according to the above (1), wherein the prourokinase mutant further has an EGF-like domain.

(3) The fusion protein according to the above (1) or (2), wherein the prourokinase mutant has an amino acid sequence having a sequence identity of 90% or more to the amino acid sequence represented by SEQ ID NO:2.

(4) The fusion protein according to any one of the above (1) to (3), wherein the antibody that binds to insoluble fibrin or an antigen-binding fragment thereof binds to a peptide consisting of the amino acid sequence represented by SEQ ID NO:17 or 18 and insoluble fibrin.

(5) The fusion protein according to any one of the above (1) to (4), wherein the insoluble fibrin antibody or an antigen-binding fragment thereof contains:
a heavy chain variable region containing heavy chain CDR1 having the amino acid sequence represented by SEQ ID NO:11, heavy chain CDR2 having the amino acid sequence represented by SEQ ID NO:12 and heavy chain CDR3 having the amino acid sequence represented by SEQ ID NO:13; and
a light chain variable region containing light chain CDR1 having the amino acid sequence represented by SEQ ID NO:14, light chain CDR2 having the amino acid sequence represented by SEQ ID NO:15 and light chain CDR3 having the amino acid sequence represented by SEQ ID NO:16.

(6) A pharmaceutical composition comprising the fusion protein according to any one of the above (1) to (5).

(7) The pharmaceutical composition according to the above (6), for use in dissolving a fibrin clot.

(8) The pharmaceutical composition according to the above (6) or (7), which is a thrombolytic agent or a fibrinolytic enzyme agent.

(9) The pharmaceutical composition according to any one of the above (6) to (8), for use in treating a disease selected from cerebrovascular disorder and myocardial infarction.

(1A) A fusion protein comprising an antibody that binds to insoluble fibrin or an antigen-binding fragment thereof and a catalytic domain of prourokinase, wherein the antibody or an antigen-binding fragment thereof and the catalytic domain of prourokinase are linked directly or via a linker to each other.

(2A) The fusion protein according to the above (1A), wherein the linker is a non-cleavable linker.

(3A) The fusion protein according to the above (1A) or (2A), wherein the linker is a peptide linker.

(4A) The fusion protein according to any one of the above (1A) to (3A), further comprising a kringle domain, wherein the kringle domain and the catalytic domain are linked to each other in this order.

(5A) The fusion protein according to any one of the above (1A) to (4A), wherein the amino acid sequence of a plasmin cleavage site in the kringle domain is modified such that the cleavage site is more resistant to plasmin cleavage.

(6A) The fusion protein according to the above (4A) or (5A), further comprising an EGF-like domain, wherein the EGF-like domain, the kringle domain and the catalytic domain are linked to each other in this order.

(7A) The fusion protein according to any one of the above (1A) to (6A), wherein the prourokinase mutant has an amino acid sequence having a sequence identity of 90% or more to the amino acid sequence represented by SEQ ID NO:2.

(8A) The fusion protein according to any one of the above (1A) to (7A), wherein the antibody that binds to insoluble fibrin or an antigen-binding fragment thereof binds to a peptide consisting of the amino acid sequence represented by SEQ ID NO:17 or 18 and insoluble fibrin.

(9A) The fusion protein according to any one of the above (1A) to (8A), wherein the insoluble fibrin antibody or an antigen-binding fragment thereof comprises:
a heavy chain variable region containing heavy chain CDR1 having the amino acid sequence represented by SEQ ID NO:11, heavy chain CDR2 having the amino acid sequence represented by SEQ ID NO:12 and heavy chain CDR3 having the amino acid sequence represented by SEQ ID NO:13; and
a light chain variable region containing light chain CDR1 having the amino acid sequence represented by SEQ ID NO:14, light chain CDR2 having the amino acid sequence represented by SEQ ID NO:15 and light chain CDR3 having the amino acid sequence represented by SEQ ID NO:16.

(10A) A pharmaceutical composition comprising the fusion protein according to any one of the above (1A) to (9A).

(11A) The pharmaceutical composition according to the above (10A), for use in dissolving a fibrin clot.

(12A) The pharmaceutical composition according to the above (10A) or (11A), which is a thrombolytic agent or a fibrinolytic enzyme agent.

(13A) The pharmaceutical composition according to any one of the above (10A) to (12A), for use in treating a disease selected from cerebrovascular disorder and myocardial infarction.

BRIEF DESCRIPTION OF DRAWINGS

FIG. 1A shows an example of a fusion protein of the present invention. In the prourokinase mutant shown in FIG. 1A, a Fab region of an anti-fibrin antibody and a prourokinase mutant are linked via a linker peptide to each other. The amino acid sequence of the prourokinase mutant portion shown in FIG. 1A is represented by SEQ ID NO:2. The prourokinase mutant shown in FIG. 1A, the amino acids at positions 135 and 136 are modified to suppress cleavage between the amino acids. The prourokinase mutant shown in FIG. 1A is preferably administered without cleavage between Lys158 and Ile159. In the figure, an active form thereof is shown (more specifically, Lys158 and Ile159 are cleaved but cysteine at position 148 and cysteine at position 279 are crosslinked by a disulfide bond). The fusion protein shown in FIG. 1A was used as a complex-form with an anti-fibrin antibody light chain, in Examples.

DETAILED DESCRIPTION OF THE INVENTION

Figure 1B:
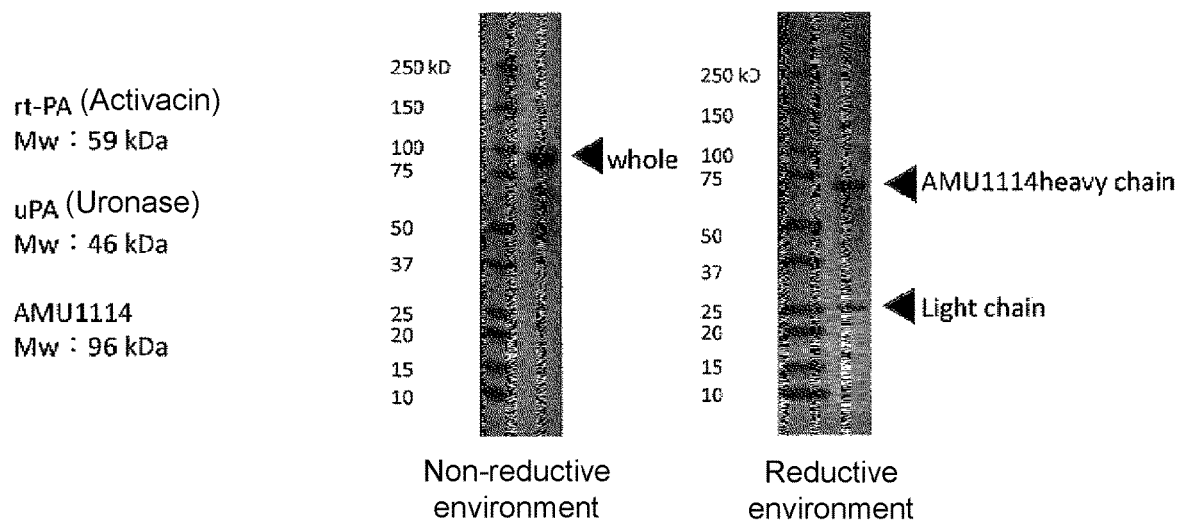
FIG. 1B shows the results of electrophoresis of fusion protein AMU1114 purified in Examples in a non-reductive environment (left panel) and in a reductive environment (right panel). In the non-reductive environment, a disulfide bond connecting the heavy chain and light chain of the antibody is not cleaved and thus AMU1114 is detected as a complex-form. In a reductive environment, the disulfide bond connecting the heavy chain and light chain of the antibody is cleaved and thus heavy chain (fusion protein) and light chain of AMU1114 are separately detected.

In the specification, the term "subject" is a mammal. The mammal may be a dog, a cat, a cow, a horse, a pig, a primate (for example, a monkey, a gorilla, an orangutan, a bonobo, a chimpanzee and a human), and more specifically, a human.

In the specification, the term "fibrin" refers to an insoluble coagulate formed by cleaving the C terminal of three types of polypeptide chains (Aα chain, Bβ chain and γ chain) that form fibrinogen. In the specification, fibrin will be sometimes referred to as insoluble fibrin. More specifically, when the C terminal of fibrinogen is cleaved, fibrinogen is converted into the state called a fibrin monomer. The fibrin monomers are polymerized by the action of calcium to form a poor-soluble fibrin polymer. The fibrin polymers are crosslinked between the polymers by the action of factor XIII to form stable fibrin (insoluble fibrin defined in the specification or fibrin gel). Insoluble fibrin is decomposed by plasmin. Plasmin is contained in the plasma in the form of a precursor, plasminogen. When plasminogen is decomposed with, e.g., a plasminogen activator (for example, urokinase, tissue plasminogen activator and streptokinase), more specifically, when the peptide between Arg and Val of plasminogen is decomposed, plasmin is produced. Plasmin is inhibited by a protein called a plasmin inhibitor and can be limited in action.

Aα chain of fibrinogen may be Aα chain of human fibrinogen. Examples of Aα chain of human fibrinogen include Aα chain of human fibrinogen having the amino acid sequence registered under GenBank registration number: AAI01936.1, and Aα chain of human fibrinogen having an amino acid sequence corresponding to the amino acid sequence.

Bβ chain of fibrinogen may be Bβ chain of human fibrinogen. Examples of Bβ chain of human fibrinogen include β chain of human fibrinogen having the amino acid sequence registered under NCBI reference number: NP_005132.2, and β chain of human fibrinogen having an amino acid sequence corresponding to the amino acid sequence.

γ chain of fibrinogen may be γ chain of human fibrinogen. Examples of γ chain of human fibrinogen include γ chain of human fibrinogen having the amino acid sequence registered under GenBank registration number: AAH07044.1, and γ chain of human fibrinogen having an amino acid sequence corresponding to the amino acid sequence.

In the specification, "urokinase" is one of serine protease called as a urokinase-type plasminogen activator (uPA) (for example, may be an enzyme registered under EC 3.4.21.73). Urokinase is produced as a precursor thereof, that is, prourokinase. When the peptide bond between Lys158 and Ile159 is cleaved, active-type urokinase (the chains cleaved are mutually linked via a disulfide bond) is formed. Urokinase has three domains: an EGF-like domain, a kringle domain and a catalytic domain. When the bond between Lys135 and Lys136 of urokinase is cleaved, a low molecular type urokinase is produced. Note that, the positions of amino acids of prourokinase are determined based on the amino acid sequence of the prourokinase after cleavage of the signal peptide. Examples of the prourokinase include human prourokinase. Examples of the human prourokinase include a human prourokinase having amino acid sequence registered under GenBank registration number: AAA61253.1 and human prourokinase having an amino acid sequence corresponding to the amino acid sequence. In the amino acid sequence registered under GenBank registration number: AAA61253.1, the amino acid sequence at positions 1 to 20 corresponds to a signal peptide.

In the specification, the term "antibody" refers to an immunoglobulin. The antibody may be one of the isotypes, for example, IgG. The antibody may be preferably a monoclonal antibody. The antibody may be a human chimeric antibody, a humanized antibody or a human antibody. The human chimeric antibody may be prepared by replacing a constant region of a non-human antibody with that of a human antibody. A humanized antibody may be prepared by replacing 6 CDRs of a human antibody with the corresponding 6 CDRs of a non-human antibody. A human antibody may be prepared by use of an animal (for example, mouse) in which at least a heavy chain variable region of an immunoglobulin is replaced with the corresponding region of a human locus. If the constant region is derived from a non-human animal, the constant region is replaced with the amino acid sequence of a human antibody. In this manner, a human antibody can be obtained. In the specification, the antibody may be preferably a humanized antibody. In the specification, the antibody may be preferably a human antibody. An antibody produced in a cell has a signal peptide but the signal peptide is cut out when it is released from the cell. Thus, when an antibody is administered as a medical agent, a signal peptide of the antibody is not required.

In the specification, the term "CDR" refers to a complementarity determining region present in a heavy chain variable region and a light chain variable region of an antibody. Three CDRs are present in each of the heavy chain and light chain variable regions and called as CDR1, CDR2 and CDR3 in the order from the N terminal. CDRs can be determined based on, for example, the numbering scheme by Kabat et.al (Kabat, E. A. et al., Sequences of Proteins of Immunological Interest, 5th ed., 1991, Bethesda: US Dept. of Health and Human Services, PHS, NIH).

In the specification, the term "antigen-binding fragment of an antibody" refers to a fragment maintaining a binding ability to an antigen. Examples of the antigen-binding fragment include Fab, Fab', F(ab')$_2$, Fv, scFv (single chain Fv), diabody and sc(Fv)$_2$ (single chain (Fv)$_2$). For example, Fab can be obtained by digesting an antibody with papain. Or F(ab')$_2$ can be obtained by digesting an antibody with pepsin. If F(ab')$_2$ is further reduced, Fab' can be obtained. Other antigen-binding fragments of an antibody can be prepared by methods commonly known to those skilled in the art. In the present invention, the antigen-binding fragments of an antibody as mentioned above can be used.

In the specification, the term "fusion protein" refers to a protein formed by linking two or more peptides derived from different proteins via a peptide bond. In the specification, a fusion protein of a first peptide and a second peptide may contain a third peptide and further an additional peptide as long as the function of the invention is not significantly decreased. Alternatively, the fusion protein may contain only a first peptide and a second peptide. In the specification, a fusion protein of a first peptide and a second peptide may contain the first peptide and the second peptide in this order or different order, as long as the function of the invention is not significantly decreased. The fusion protein preferably contains a first peptide and a second peptide in this order. In a fusion protein, the two or more peptides derived from different proteins, may be linked with a linker interposed between them or without a linker, as long as the function of the invention is not significantly decreased. In the case where proteins are linked via a linker to each other, a flexible linker may be used.

According to the present invention, there is provided a fusion protein of an antibody that binds to insoluble fibrin or an antigen-binding fragment thereof and prourokinase. Prourokinase has at least a catalytic domain. Prourokinase may further have a kringle domain. Prourokinase may further have an EGF-like domain and a kringle domain.

Thus, according to the present invention, there is provided, for example, a fusion protein of an antibody that binds to insoluble fibrin or an antigen-binding fragment thereof and prourokinase, which has a kringle domain and a catalytic domain. According to the present invention, there is provided, for example, a fusion protein of an antibody that binds to insoluble fibrin or an antigen-binding fragment thereof and prourokinase, which has an EGF-like domain, a kringle domain and a catalytic domain. According to the present invention, in a preferable embodiment, prourokinase may be a mutant having a kringle domain and no plasmin cleavage site, or may be a prourokinase mutant having a kringle domain, in which the amino acid sequence of a plasmin cleavage site is modified such that the possibility of cleavage by plasmin is reduced.

According to the present invention, there is provided a fusion protein of an antibody that binds to insoluble fibrin or an antigen-binding fragment thereof and a prourokinase mutant, which has a catalytic domain and a kringle domain, and in which the amino acid sequence of a plasmin cleavage site is modified such that the possibility of cleavage by plasmin is reduced (for example, a plasmin-cleavage resistant mutant destroyed in plasmin cleavage site). In an embodiment, the mutant may be a mutant in which a plasmin cleavage site is destroyed. In an embodiment, the mutant may be a mutant in which a plasmin cleavage site is removed.

To define strictly, the fusion protein of the present invention is a fusion protein consisting of a heavy chain of the antibody that binds to insoluble fibrin or an antigen-binding fragment thereof and a prourokinase mutant, or consisting of a light chain of the antibody that binds to insoluble fibrin or an antigen-binding fragment thereof and a prourokinase mutant. If the antigen-binding fragment is a single strand, a fusion protein may be a fusion protein of an antigen-binding fragment of the antibody that binds to insoluble fibrin and a prourokinase mutant.

In the specification, the terms "heavy chain" and "light chain" used in the context of an antigen-binding fragment mean whether the antibody fragment is derived from the "heavy chain" or "light chain" of the original antibody but does not mean large or small in molecular weight of the antigen-binding fragment.

In the fusion protein of the present invention, a prourokinase mutant has a catalytic domain and a kringle domain, in which the amino acid sequence of a plasmin cleavage site is modified to be more resistant to cleavage with plasmin. Alternatively, a prourokinase mutant is a mutant having a catalytic domain and a kringle domain in which the possibility of cleavage at a plasmin cleavage site is reduced (or cleavage is inhibited); in other words, a mutant having a low possibility of being cleaved into low molecular type urokinase. The low possibility may be a reduction rate of 50% or more, 60% or more, 70% or more, 80% or more, 90% or more, or 95% or more compared to, for example, before modification (for example, prourokinase having the amino acid sequence represented by SEQ ID NO:1). The low possibility of cleavage can be confirmed in an in-vitro assay system by those skilled in the art. The cleavage at the plasmin cleavage site in the kringle domain may occur between Lys135 and Lys136 of human urokinase and between the corresponding amino acids of urokinase. Thus, a urokinase mutant may be prepared by modification (substitution, insertion and deletion) to the amino acid sequence of the cleavage site, for example, by substitution of either one or both of Lys135 and Lys136 to other amino acids, for example, glycine. A prourokinase mutant may be prepared also by modification to the amino acid sequence of a plasmin recognition site thereof. The amino acid sequences of the plasmin cleavage site and recognition site can be appropriately modified by those skilled in the art. A prourokinase mutant has a plasmin cleavage site (between Lys158 and Ile159) in the catalytic domain. The two peptides produced after cleavage are linked with a disulfide bond between cysteine residues (Cys148 and Cys279) present in the catalytic domains of the two peptides, respectively. Thus, the two cysteine residues in the catalytic domain responsible for formation of the disulfide bond are maintained in a prourokinase mutant.

As the prourokinase mutant, any prourokinase mutant can be used as long as it does not significantly reduce the ability of a plasminogen activator and it has a low possibility of cleavage between amino acids corresponding to Lys135 and Lys136 of human urokinase. Examples of the prourokinase mutant include a prourokinase mutant, which has an amino acid sequence having an identity of 90% or more, 95% or more, 98% or more, 99% or more or 100% to the amino acid sequence of SEQ ID NO:1 (however, as defined, a mutant reduced in possibility of cleavage at a plasmin cleavage site in the kringle domain, for example, a mutant in which either one or both of amino acids of Lys135 and Lys136 have been modified, for example, a mutant substituted with glycine, whereas, two cysteine residues present in the catalytic domain and connecting the two peptides produced after cleavage between Lys158 and Ile159 are maintained), or a prourokinase mutant, which has the amino acid sequence of SEQ ID NO:2.

In the fusion protein of the present invention, the catalytic domain may be a catalytic domain consisting of a single peptide (more specifically, catalytic domain before cleavage between Lys158 and Ile159), or a catalytic domain consisting of two peptides (i.e., a complex obtained by connecting two peptides, which are obtained by cleavage between Lys158 and Ile159 (in other words, a peptide from the N terminal to Lys158 and a peptide from Ile150 to the C terminal), through crosslinking (for example, crosslinking between amino acid side chains) such as a complex obtained by connecting two peptides, which are obtained by cleavage between Lys158 and Ile159 (more specifically, a peptide from the N terminal to Lys158 and a peptide from Ile150 to the C terminal) via a disulfide bond). In the fusion protein of the present invention, preferably, the catalytic domain is constituted of a single peptide (more specifically, a catalytic domain before cleavage between Lys158 and Ile159).

Prourokinase, a catalytic domain thereof or a mutant of prourokinase may have a signal peptide. However, since the signal peptide is unnecessary for dosage form, prourokinase may not have a signal peptide.

Prourokinase or a mutant thereof may have, for example, an EGF-like domain, a kringle domain and a catalytic domain.

In the fusion protein of the present invention, the antibody that binds to insoluble fibrin is an antibody that binds to insoluble fibrin with a stronger affinity than to fibrinogen (in other words, an antibody that binds to insoluble fibrin with low dissociation constant KD than to fibrinogen). The antibody that binds to insoluble fibrin with a stronger affinity than to fibrinogen may be, for example, an antibody that binds to a peptide consisting of the amino acid sequence represented by SEQ ID NO:17 or 18 (see WO2014/133093). The amino acid sequence represented by SEQ ID NO:17 corresponds to the amino acid sequence represented by SEQ ID NO:1 in WO2014/133093. The amino acid sequence represented by SEQ ID NO:18 corresponds to the amino acid sequence represented by SEQ ID NO:2 in WO2014/133093. In a preferable embodiment, an antibody that binds to insoluble fibrin with a stronger affinity than to fibrinogen binds to insoluble fibrin with an affinity 2 times or more, 3 times or more, 4 times or more, 5 times or more, 6 times or more, 7 times or more, 8 times or more, 9 times or more, 10 times or more, 20 times or more, 30 times or more, 40 times or more, 50 times or more, 60 times or more, 70 times or more, 80 times or more, 90 times or more, 100 times or more, 200 times or more, 300 times or more, 400 times or more, 500 times or more, 600 times or more, 700 times or more, 800 times or more, 900 times or more, 1,000 times or more, 10,000 times or more, 100,000 times or more, as strong as to fibrinogen {the larger the difference in affinity, the more preferable}.

The antibody that binds to insoluble fibrin with a stronger affinity than to fibrinogen or an antigen-binding fragment thereof is, for example, an antibody or an antigen-binding fragment thereof having CDRs corresponding respectively to heavy chain CDR1 to 3 and light chain CDR1 to 3 of an antibody selected from the group consisting of 10-102 antibody, 34-105 antibody and Fib-0355 antibody disclosed in WO2014/133093.

The antibody that binds to insoluble fibrin with a stronger affinity than to fibrinogen or an antigen-binding fragment thereof is also, for example, an antibody or an antigen-binding fragment thereof having CDRs corresponding respectively to heavy chain CDR1 to 3 and light chain CDR1 to 3 of an antibody selected from the group consisting of 99 antibody, 1101 antibody and 0211 antibody disclosed in WO2018/203517.

In the fusion protein of the present invention, examples of the antibody that binds to insoluble fibrin with a stronger affinity than to fibrinogen or an antigen-binding fragment thereof, include an antibody or an antigen-binding fragment thereof, containing:
 a heavy chain variable region containing heavy chain CDR1 having the amino acid sequence represented by SEQ ID NO:11, heavy chain CDR2 having the amino acid sequence represented by SEQ ID NO:12 and heavy chain CDR3 having the amino acid sequence represented by SEQ ID NO:13; and
 a light chain variable region containing light chain CDR1 having the amino acid sequence represented by SEQ ID NO:14, light chain CDR2 having the amino acid sequence represented by SEQ ID NO:15 and light chain CDR3 having the amino acid sequence represented by SEQ ID NO:16.

The antibody may be a human chimeric antibody or a humanized antibody. According to the present invention, there is provided a humanized antibody having the above heavy chain variable region and light chain variable region.

In the fusion protein of the present invention, examples of the antibody that binds to insoluble fibrin with a stronger affinity than to fibrinogen or an antigen-binding fragment thereof, include an antibody or an antigen-binding fragment thereof, containing:
 a heavy chain variable region having an amino acid sequence at positions 20 to 139 in the amino acid sequence represented by SEQ ID NO:5; and
 a light chain variable region having an amino acid sequence at positions 23 to 130 in the amino acid sequence represented by SEQ ID NO:4.

In the fusion protein of the present invention, the antibody may further contain a heavy chain constant region in the Fab fragment or a part thereof in addition to a heavy chain variable region. In the fusion protein of the present invention, the antibody may be a human chimeric antibody or a humanized antibody. According to the present invention, there is provided a humanized antibody having the above heavy chain variable region and light chain variable region.

Prourokinase, a catalytic domain thereof or a mutant of prourokinase may be linked to the antibody that binds to insoluble fibrin or an antigen-binding fragment thereof via or not via a linker. As the linker, any linker can be used as long as it does not significantly reduce the effect of the invention. The examples of the peptide linker include a flexible linker (or flexible peptide linker) such as a linker consisting of glycine and serine (GS linker). Examples of the GS linker include (GGGGS)$_n$ {herein, n is any one of natural numbers of 1 to 5, preferably a natural number 2 or 3, and preferably 3}. Examples of the flexible linker include a linker having an amino acid sequence represented, for example, by SEQ ID NO:19.

The fusion protein of the present invention, if the antibody or an antigen-binding fragment thereof requires a light chain variable region for recognizing an antigen, may form a complex with the light chain variable region. When it is not necessary for the fusion protein of the present invention to form a complex with another peptide, for binding to an antigen (for example, the case where the fusion protein contains a light chain variable region or the case where the fragment thereof is scFv and the like), it is not necessary to further form a complex with another light chain (more specifically, may be a free form). The free form refers to a form not forming a complex with a light chain.

The fusion protein of the present invention, in a preferable embodiment, may be a fusion protein of a heavy-chain Fab region of an antibody that binds to fibrin or an antigen-binding fragment thereof, and a prourokinase mutant having an EGF-like domain, a kringle domain and a catalytic domain. The fusion protein may have a complex-form with a light chain of an antibody that binds to the fibrin. In this embodiment, an antigen-binding fragment of the antibody that binds to fibrin may contain:
  a heavy chain variable region containing heavy chain CDR1 having the amino acid sequence represented by SEQ ID NO:11, heavy chain CDR2 having the amino acid sequence represented by SEQ ID NO:12 and heavy chain CDR3 having the amino acid sequence represented by SEQ ID NO:13; and
  a light chain variable region containing light chain CDR1 having the amino acid sequence represented by SEQ ID NO:14, light chain CDR2 having the amino acid sequence represented by SEQ ID NO:15 and light chain CDR3 having the amino acid sequence represented by SEQ ID NO:16; and more preferably, may contain:
  a heavy chain variable region having an amino acid sequence at positions 20 to 139 in the amino acid sequence represented by SEQ ID NO:5; and
  a light chain variable region having an amino acid sequence at positions 23 to 130 in the amino acid sequence represented by SEQ ID NO:4.

The heavy chain variable region mentioned above may further contain a heavy chain constant region of a Fab region thereof or a part thereof. In the above embodiment, preferably, Lys135 and Lys136 of a plasmin cleavage site of the kringle domain can be both modified to glycine.

According to the present invention, the fusion protein of the present invention can be prepared by a method known to those skilled in the art. For example, the fusion protein of the present invention can be expressed in cells (insect cells, bird cells, *Escherichia coli* cells, yeast cells, and mammalian cells), preferably, mammalian cells (for example, cells suitable for expressing a protein, for example, Chinese hamster ovary cells (CHO cells) and mammalian cells suitable for expressing a protein, such as 293 cells and cells derived from these like human cells). Expression can be made, for example, by using an expression vector, which contains a nucleic acid encoding a fusion protein of the present invention and is operably linked to a promoter driven in the expression cells mentioned above. If a light chain is required for the fusion protein, the light chain can be co-expressed in the expression cells. According to the present invention, the fusion protein of the present invention can be purified by a purification method known to those skilled in the art. Purification can be carried out by, e.g., an affinity column containing an antigen or an affinity column to a tag attached to a fusion protein.

According to the present invention, there is provided a composition and a pharmaceutical composition containing the fusion protein of the present invention (for example, a fusion protein of an antibody of the present invention or an antigen-binding fragment thereof and a prourokinase mutant). The pharmaceutical composition of the present invention may further contain a pharmaceutically acceptable excipient in addition to the fusion protein of the present invention (for example, a fusion protein of an antibody of the present invention or an antigen-binding fragment thereof and a prourokinase mutant). Examples of the pharmaceutically acceptable excipient include a salt, a tonicity agent, a pH regulator and water. In an embodiment, the pharmaceutical composition of the present invention can be provided in the form of a kit containing a lyophilized pharmaceutical composition and water for injection (i.e., a kit for preparing an injection just before use).

A pharmaceutical composition containing the fusion protein of the present invention (for example, a fusion protein of an antibody of the present invention or an antigen-binding fragment thereof and a prourokinase mutant), can be parenterally administered (for example, intravascular administration such as intravenous administration). In the intravascular administration, for example, administration may be carried out near blood clot, in particular, upstream of blood clot to blood flow (in the direction of blood flow). When the pharmaceutical composition of the present invention is intravenously administered, the pharmaceutical composition can be prepared so as to be suitable for intravenous administration. The pharmaceutical composition for intravenous administration can be appropriately prepared by those skilled in the art in the same manner as in preparation of, for example, a protein preparation and an antibody preparation. The dose, administration timing, route of administration and others can be appropriately determined by a doctor. For example, the pharmaceutical composition of the present invention can be intravenously administered within several hours (for example, 4 hours) after the onset of thrombosis.

The pharmaceutical composition of the present invention may contain a therapeutically effective amount of a fusion protein of the present invention (for example, a fusion protein of an antibody or an antigen-binding fragment thereof and a prourokinase mutant). The therapeutically effective amount refers to an amount at which a therapeutic effect is exerted on thrombosis or a disease derived from thrombosis. The therapeutic effect may depend on recanalization of the blood vessel and restoring blood flow due to dissolution of a blood clot.

The pharmaceutical composition of the present invention can be used for dissolving a fibrin clot. The fibrin clot may be a blood clot.

The pharmaceutical composition of the present invention may be a thrombolytic agent or a fibrinolytic enzyme agent.

The pharmaceutical composition of the present invention can be used for treating thrombosis, for example, a disease selected from cerebrovascular disorder and myocardial infarction. The disease may be a disease caused by a blood clot due to fibrin. The disease may be a disease that is suitably treated by a method of dissolving a fibrin clot. The disease can be observed by in-vivo imaging using a fibrin-binding antibody (and a conjugate of the antibody with an imaging agent).

According to the present invention, there is provided use of a protein selected from the group consisting of an antibody that binds to fibrin or an antigen-binding fragment thereof according to the present invention, a prourokinase mutant of the present invention and the fusion protein of the present invention, in the manufacture of a medicament for use in dissolving a fibrin clot. According to the present invention, there is provided use of a protein selected from the group consisting of an antibody that binds to fibrin or an antigen-binding fragment thereof according to the present invention, a prourokinase mutant of the present invention, and the fusion protein of the present invention, in the manufacture of a medicament that is a thrombolytic agent or a fibrinolytic enzyme agent. According to the present invention, there is provided use of a protein selected from the group consisting of an antibody that binds to fibrin or an antigen-binding fragment thereof according to the present invention, a prourokinase mutant of the present invention, and the fusion protein of the present invention in the manufacture of a medicament that is a thrombolytic agent or a fibrinolytic enzyme agent. According to the present invention, there is provided use of a protein selected from the group consisting of an antibody that binds to fibrin or an antigen-binding fragment thereof according to the present invention, a prourokinase mutant of the present invention, and the fusion protein of the present invention in the manufacture of a medicament for use in treating a disease selected from cerebrovascular disorder and myocardial infarction.

According to the present invention, there is provided a method for administering a medicament to a subject, in which the medicament is a fusion protein of the present invention. According to the present invention, there is provided a method for dissolving a fibrin clot in a subject who needs it, including administering a fusion protein of the present invention. According to the present invention, the subject who needs it may be a subject having a blood clot. According to the present invention, there is provided a method for treating a disease in the subject in need thereof, including administering a fusion protein of the present invention. The disease herein may be a disease caused by a blood clot and a disease to be treated by dissolution of a blood clot, for example, a disease selected from cerebrovascular disorder (for example, cerebral infarction) and myocardial infarction.

Example 1: Preparation of Fusion Protein of Anti-Fibrin Antibody and Prourokinase Mutant In this example, the title fusion protein was designed and prepared.
[Design of Fusion Protein]
Design of Prourokinase Mutant The Fab region of a humanized anti-fibrin antibody was designed by using CDR regions of anti-fibrin antibody 1101 (as to 1101 clone, see WO2018/203517). 135Lys and 136Lys constituting a plasmin cleavage site of prourokinase (SEQ ID NO:1) were modified to 135Gly and 136Gly, respectively (SEQ ID NO:2). By the modification, the active domain of urokinase is designed to be able to continuously dissolve insoluble fibrin without being cleaved at the site with plasmin activated on insoluble fibrin (see, FIG. 1).
Design of Fusion Protein The fusion protein represented by SEQ ID NO:3 was designed by connecting a Fab region of an antibody produced by 1101 clone and the prourokinase mutant mentioned above via a linker. The fusion protein was labeled with a His tag at the C terminal. Further, a light chain having the amino acid sequence represented by SEQ ID NO:4 was designed. The fusion protein designed will be sometimes referred to as an AMU1114 heavy chain. The fusion protein having the amino acid sequence represented by SEQ ID NO:3 has a structure where a Fab region of the antibody represented by SEQ ID NO:5 is linked to a prourokinase mutant represented by SEQ ID NO:2, via the linker represented by SEQ ID NO:19. The light chain was expressed as another peptide and allowed to form a complex with the AMU1114 heavy chain mentioned above.

More specifically, a gene encoding a Fab region was amplified by a PCR method based on a heavy chain gene of an anti-fibrin antibody produced by the above 1101 clone. Further, a gene of prourokinase was amplified by a PCR method and a mutation was introduced into the prourokinase gene in accordance with a site-specific mutagenesis method to obtain the mutant mentioned above.

The primers used herein were as follows.

```
                                              (SEQ ID NO: 6)
ACTTGAATTCCACCATGGGCTCTACAGCAATCCTCGCTTTG (SEQ ID NO: 7)
ATAAGGATCCTTTACCCGGAGACAGGGAGAGGCTCTTC (SEQ ID NO: 8)
GAGGCTCGAGTCTTAAGTTTCAATGCGGCCAG (SEQ ID NO: 9)
ATAAGCGGCCGCTCAATGGTGGTGGTGGTGATGATGGTGACTTGCTCCG
CCTGCGGAAAGCGCCAGACCATTTTCTTC
```

After an amplified product was purified by a kit, Promega Wizard™ SV Gel and PCR Clean-Up System, pcDNA3.3 and the PCR product were separately subjected to treatment with restriction enzymes by EcoRI and NotI and cloned. Thereafter, further PCR method was carried out by using primers containing the following linker sequence to obtain a fusion protein.

```
                                             (SEQ ID NO: 10)
GAAGAGCCTCTCCCTGTCTCCGGGTAAAGGATCCGGTGGAGGTGGCAGT
GGTGGGGAGGCTCAGGAGCTCGAGTCTTAAGTTTCAATGCGGCCAGAA
AAC
```

[Expression and Purification of Fusion Protein]

The fusion protein and the light chain peptide were allowed to transiently express by ExpiCHO Expression System (Thermo Fisher). For suppressing enzyme activity, FBS was added to a culture medium so as to obtain a concentration of 20%. The culture supernatant obtained by the transient expression was subjected to Superdex 75 pg(GE) gel filtration column equilibrated with 50 mM Tris-HCl pH8.5, 300 mM NaCl. The elution region of a desired product was recovered from the gel filtration column, subjected to purification by Ni column and further to purification by Superdex 200 pg (GE) gel filtration column to obtain a final product.
[Confirmation of Final Product]

The final product was analyzed by SDS-PAGE in reductive and non-reductive environments. In the non-reductive environment, it is presumed that the fusion protein forms a complex with the light chain (hereinafter sometimes referred to as "AMU1114 complex" or simply "AMU1114"). As shown in the electrophoretic photograph of the left panel of FIG. 1B, the complex was observed as a single band at a molecular weight of about 100 kDa. In the reductive environment, since S—S bond connecting the fusion protein and the light chain is cleaved, it is presumed that the fusion protein and the light chain are separately detected. As shown in the electrophoretic photograph of the right panel of FIG. 1B, the fusion protein (AMU1114 heavy chain) was observed as a single band at a molecular weight of about 75 kDa, whereas the light chain was observed as a single band at a molecular weight of about 25 kDa. These values matched with theoretical values.

Example 2: In-Vitro Dissolution Test for Fibrin Gel

In this example, activities of existing thrombolytic agents (Activacin (t-PA, generic name: alteplase) and Uronase (u-PA, generic name: urokinase)) and AMU1114 to dissolve fibrin gel were compared in an in-vitro system.

Fibrin gel (insoluble fibrin) was prepared as follows. Blood was taken by a vacuum blood-collection tube (Venoject II vacuum blood collection tube, VP-P070K30 Terumo) and centrifuged by Medifuge at room temperature for 13 minutes. The plasma was collected. To the plasma collected, human fibrinogen (human fibrinogen AF647) fluorescently labelled with Alexa Fluor647 was added in a 1/100 volume ratio to the plasma. The plasma containing human fibrinogen AF647 was dispensed in wells of a 96-well plate in a volume of 140 µL per well. Thereafter, 20 NIH units/mL thrombin was added in a volume of 7.5 µL per well. The plate was allowed to stand still at room temperature for 15 minutes. After confirming that the plasma was coagulated, centrifugation was carried out at 500×g for 3 minutes to prepare fibrin gel. Washing with 100 µL of PBS was repeated five times for washing away impurities.

The dissolution test for fibrin gel was carried out as follows. The concentrations of an Activacin injection 6 million units (Kyowa Kirin), a Uronase injection for intravenous infusion, 120,000 units (Mochida Pharmaceutical) and AMU1114 were adjusted with PBS to be 2 mg/mL, 1 mg/mL and 0.5 mg/mL, respectively. Each of the sample solutions was diluted 10 fold with human plasma (Kohjin Bio) and allowed to react at 37° C. for 120 minutes. Each of the reacted samples was diluted further 10 fold with the human plasma and added to fibrin gel (150 µL/well). After addition to fibrin gel, a reaction was carried out at 37° C. for one hour. Alexa Fluor647 (Ex647/Em680) eluted (present) in the supernatant was measured. In this test system, an increase of fluorescence intensity means that fibrin gel was dissolved.

Figure 2:
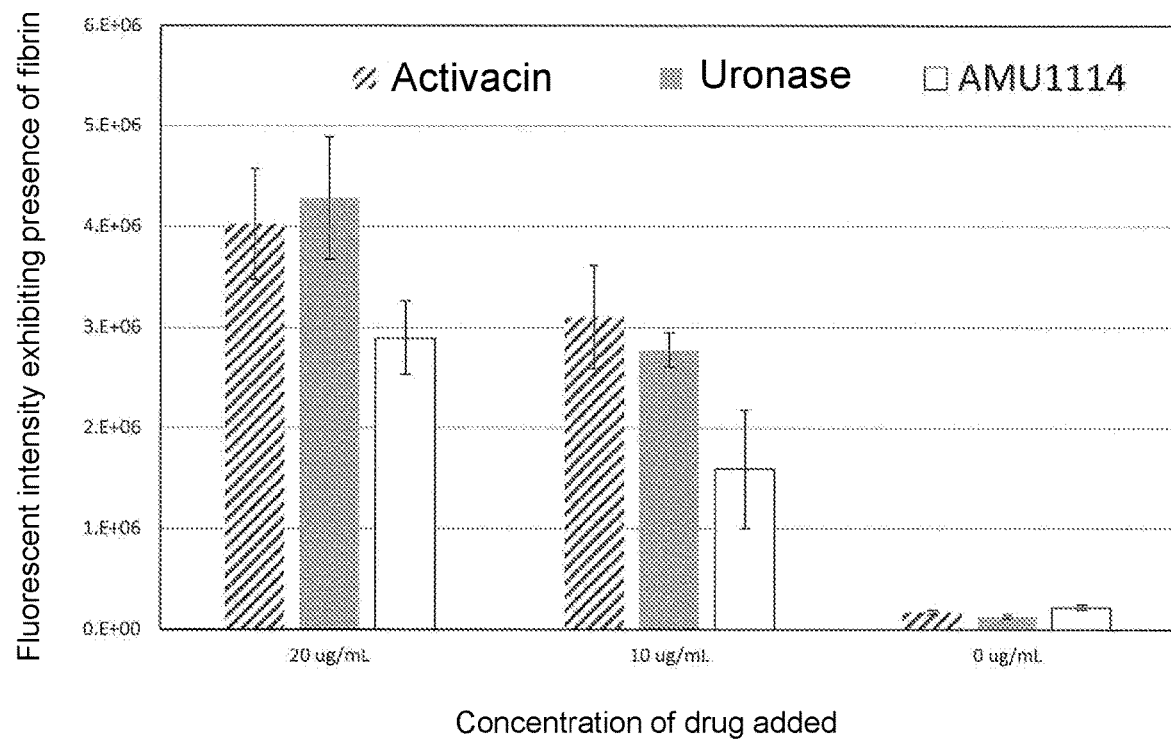
FIG. 2 shows the results of in-vitro fibrin gel dissolution test. Activacin, Uronase and AMU1114 were used at predetermined concentrations in the test. Fibrin gel solubility was detected based on the intensity of fluorescence from fibrin dissolved in a solution.

The results are shown in FIG. 2. As is apparent from FIG. 2, it was found that Activacin, Uronase and AMU1114 all have an activity to dissolve fibrin gel by adding them to fibrin gel. Since the activity of 10 µg/mL of Activacin and Uronase to dissolve fibrin gel is equal to that of 20 µg/mL of AMU1114, use of Activacin, Uronase and AMU1114 in a concentration ratio of 1:1:2 was decided in the following Examples. Note that, as shown in FIG. 1B, the molecular weight of AMU1114 is almost twice as large as those of Activacin and Uronase. Thus, it is apparent that Activacin, Uronase and AMU1114 at the above concentrations have the same molar concentration.

Example 3: Effect of Drug Administration on In-Vivo Blood Plasminogen Level

A urokinase preparation is administered to the blood, plasminogen in the blood is decomposed into plasmin. Since plasmin has an activity to decompose fibrin generated in the blood, an increase in blood plasminogen level may cause a systemic side effect, anticoagulation (anticlotting). In this example, the effects of Activacin, Uronase and AMU1114 on in-vivo blood plasminogen level were examined.

As administration drugs, the concentrations of Activacin and Uronase each were adjusted with PBS to be 2 mg/mL. The concentration of AMU1114 was adjusted to be 4 mg/mL. These were each separately administered to mice (C57BL/6J, n=3, each having a body weight of 20 g) at a dose of 100 µL/mouse by tail vein injection. Thirty minutes later, 500 µL of blood was taken from the heart of each of the mice under anesthesia with isoflurane, immediately transferred to 1.5 mL tubes and cooled with a refrigerant until use. Note that, in taking blood, a syringe, to which 50 µL of a 19% sodium citrate solution was added by suction in advance, was used. The blood samples were taken and immediately centrifuged at 10,000×g for 2 minutes. The plasma was recovered and frozen at −80° C.

Each of the plasma samples frozen at −80° C. was dissolved on ice. After dissolution, the plasma was diluted 40 fold with TBS. With 20 µL of the diluted sample, 100 µL of 250 units/mL Uronase was mixed. A negative control sample was prepared by adding 100 µL of TBS to 20 µL of the diluted sample and allowed to react at 37° C. for one hour. Thereafter, the sample was mixed with 20 µL of a substrate (Testzym S PLG, SEKISUI MEDICAL CO., LTD.) and a reaction was carried out at 37° C. for 6 hours. After completion of the reaction, absorbance at 405/505 was measured. From the absorbance values measured, the ratios (%) of plasminogen levels of the samples to the plasminogen level (untreated) in the blood plasma taken from untreated mice were calculated.

Figure 3:
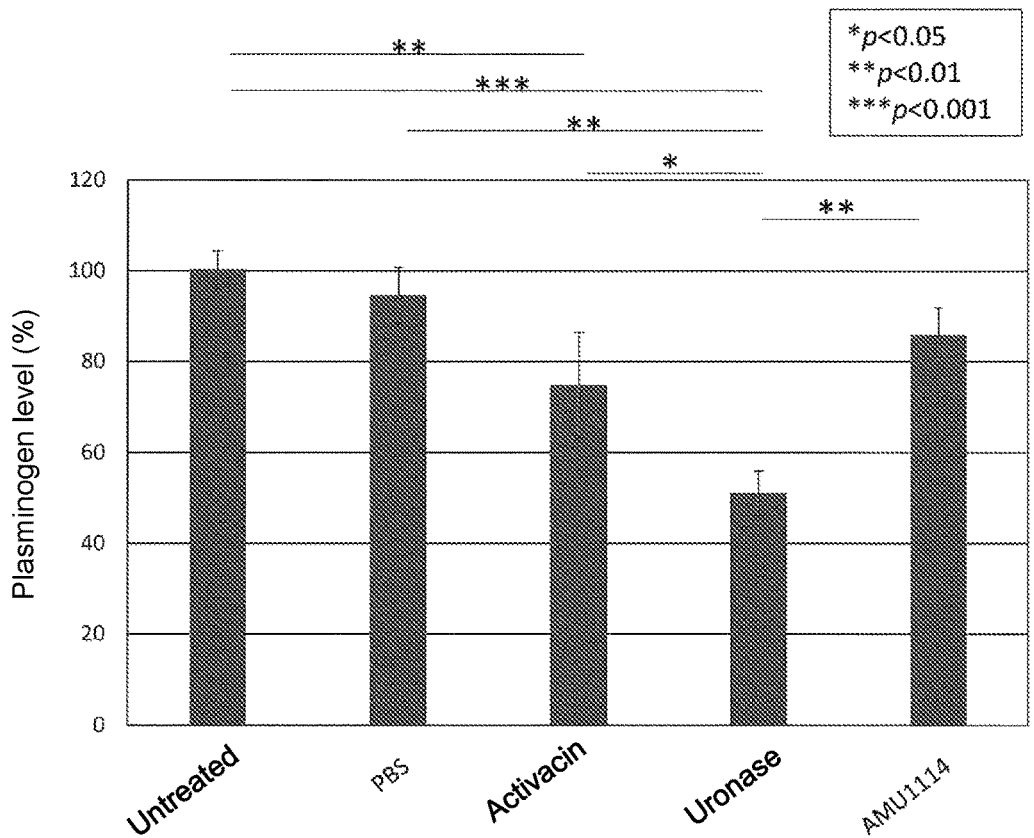
FIG. 3 shows the blood plasminogen levels measured after drugs shown in the figure were separately administered. The degree of conversion from plasminogen to plasmin in the blood can be estimated based on a decrease of the blood plasminogen level.

The results are shown in FIG. 3. As is apparent from FIG. 3, it was confirmed that blood plasminogen level decreases in the cases of Activacin and Uronase, whereas the decrease in the blood plasminogen level of AMU1114 is smaller. Particularly, even compared to Activacin (t-PA), the ability of AMU1114 to activate blood plasminogen was low.

Example 4: In-Vivo Experiment on Clot Formation and Recanalization

In this example, a blood clot was formed in the carotid artery of mice by the PIT method, and thereafter, a drug was administered. The time of recanalization and embolization of the carotid artery were determined. In the PIT method, clot formation promotion is utilized after platelet aggregation due to damages of endothelial cells by singlet oxygen generation at an irradiation site when rose bengal is irradiated with light having a wavelength of 540 nm.

To mice having an average weight of 30 g (each administration group n=10), Activacin was administered in a dose of 90 µL at 3 mg/kg and AMU1114 was administered in a dose of 180 µL at 6 mg/kg. At the doses, Activacin and AMU1114 produce the same activity, in vitro. The experiment was outsourced to LSI Medience Corporation having many achievements in mouse thrombus experiments.

In each experiment, a rose bengal pigment was administered at time 0 and irradiated with light to initiate clot formation in the carotid artery. 5 minutes after initiation of clot formation, PBS, AMU1114 or Activacin was administered. 30 minutes after initiation of clot formation, irradiation was terminated. Observation was completed 60 minutes after initiation of clot formation. In 60-minute observation time, the time during which embolization of the carotid artery occurred and the time during which recanalization of the carotid artery occurred were measured.

Figure 4:
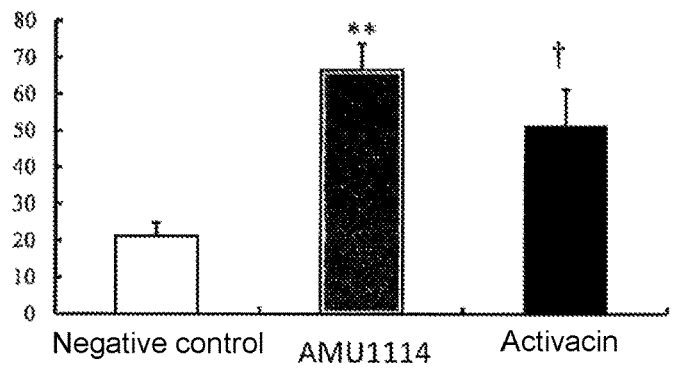
FIG. 4 shows the results of recanalization time of the blood vessel monitored, in thrombogenesis mouse models administered with rose bengal and then irradiated with light, for 60 minutes after initiation of light irradiation (after initiation of thrombus formation). Light irradiation was initiated at time 0.5 minutes after initiation of light irradiation, PBS (negative control), AMU1114 or Activacin was administered. Light irradiation was stopped 30 minutes after initiation of light irradiation. Whether the blood vessel was recanalized or not was observed until 60 minutes after initiation of light irradiation.

The summary of the results are as shown in FIG. 4. As is apparent from FIG. 4, blood-vessel recanalization time (the ratio of recanalization time to the entire observation time) was significantly long in the Activacin administration group, compared to that of a negative control, and further longer in the AMU1114 administration group.

Figure 5A:
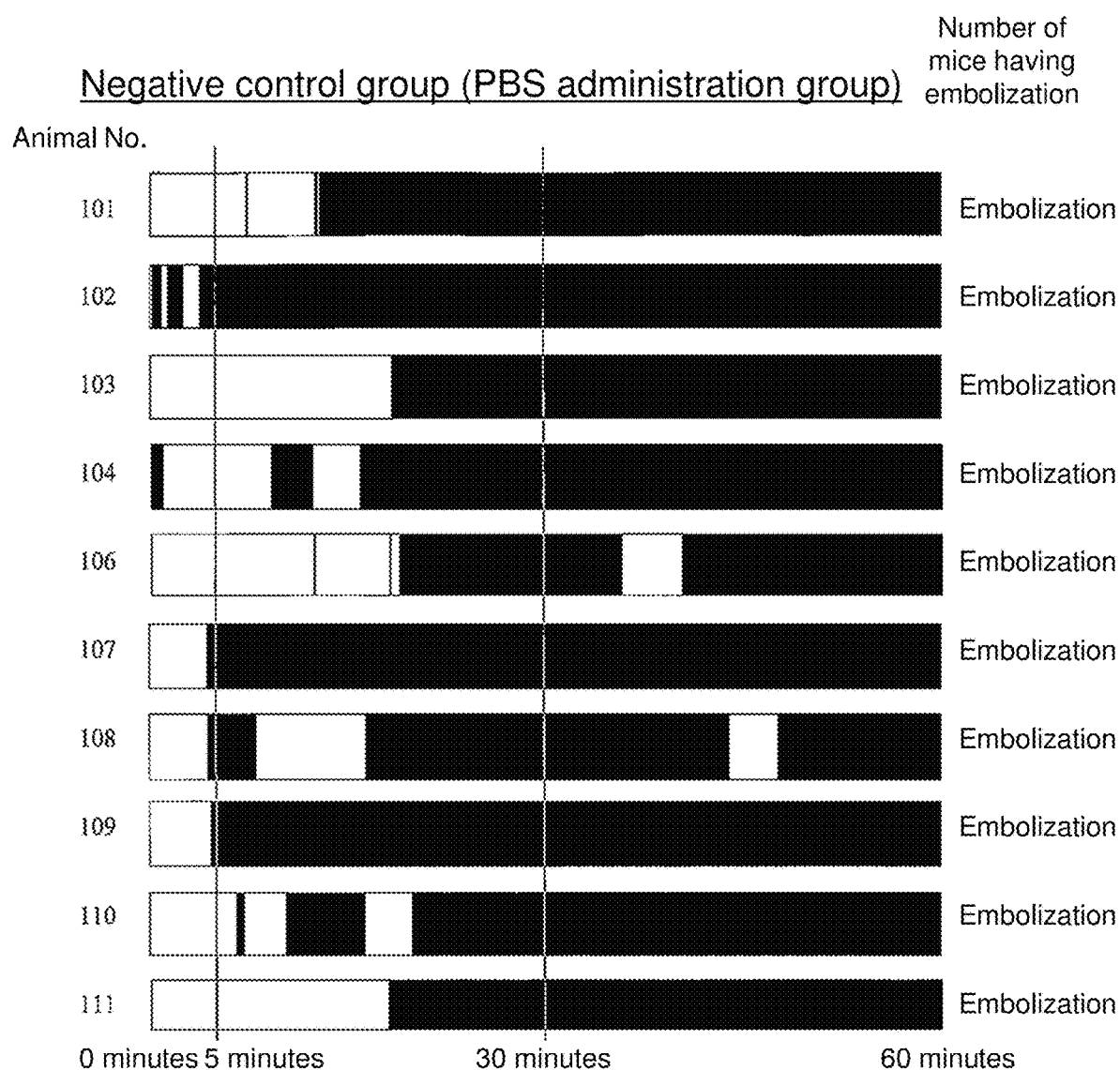
FIG. 5A shows the results of recanalization time of the blood vessel monitored in thrombogenesis mouse models administered with rose bengal and then irradiated with light, for 60 minutes after initiation of light irradiation (after initiation of thrombus formation). The results of 10 mice were individually shown. Light irradiation was initiated at time 0.5 minutes after initiation of light irradiation, PBS (negative control) was administered. Light irradiation was stopped 30 minutes after initiation of light irradiation. Whether the blood vessel was recanalized or not was observed until 60 minutes after initiation of light irradiation.
Figure 5B:
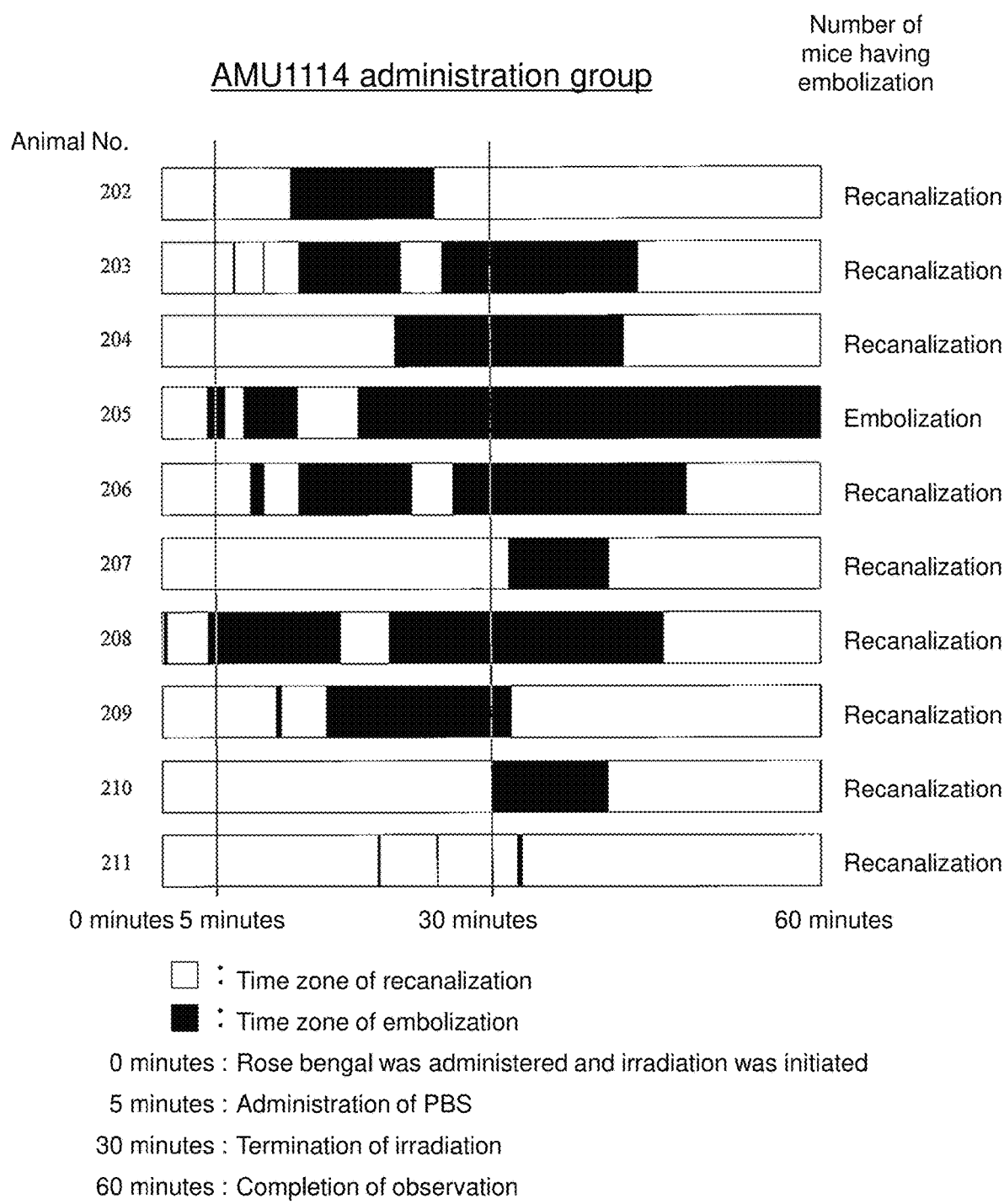
FIG. 5B shows the results of recanalization time of the blood vessel monitored in thrombogenesis mouse models administered with rose bengal and then irradiated with light, for 60 minutes after initiation of light irradiation (after initiation of thrombus formation). The results of 10 mice were individually shown. Light irradiation was initiated at time 0.5 minutes after initiation of light irradiation, AMU1114 was administered. Light irradiation was stopped 30 minutes after initiation of light irradiation. Whether the blood vessel was recanalized or not was observed until 60 minutes after initiation of light irradiation.
Figure 5C:
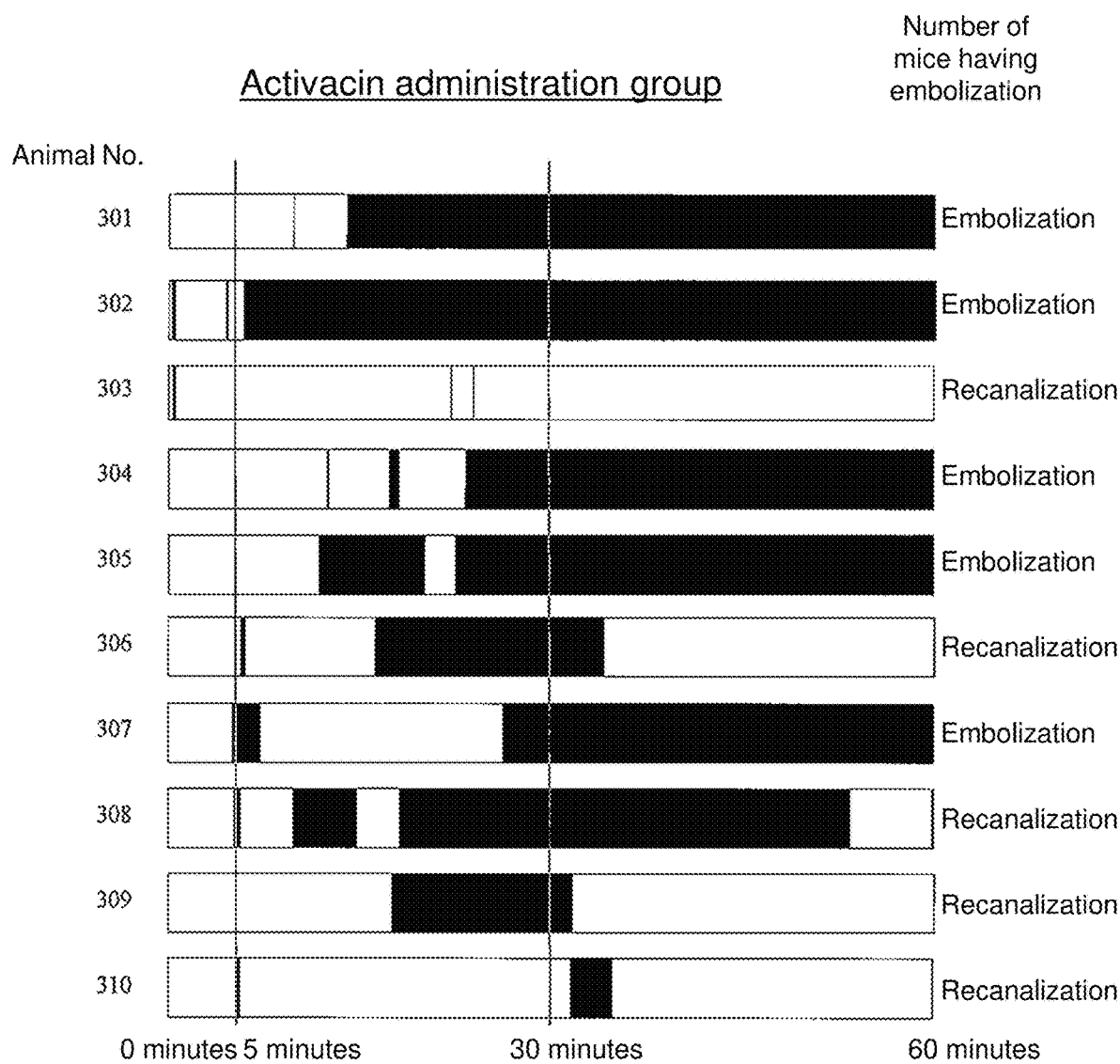
FIG. 5C shows the results of recanalization time of the blood vessel monitored in thrombogenesis mouse models administered with rose bengal and then irradiated with light, for 60 minutes after initiation of light irradiation (after initiation of thrombus formation). The results of 10 mice were individually shown. Light irradiation was initiated at time 0.5 minutes after initiation of light irradiation, Activacin was administered. Light irradiation was stopped 30 minutes after initiation of light irradiation. Whether the blood vessel was recanalized or not was observed until 60 minutes after initiation of light irradiation.

The details of the results were as shown in FIG. 5A (negative control group), FIG. 5B (AMU1114 administration group), and FIG. 5C (Activacin administration group). In the negative control group, embolization was observed in 10 out of 10 mice at the end of the experiment (see, FIG.

5A). In contrast, as shown in FIG. 5B, embolization was observed in only one out of 10 mice in the AMU1114 administration group and recanalization was observed in 9 mice. As shown in FIG. 5C, in the Activacin administration group, embolization was observed in 5 out of 10 mice.

Figure 5D:
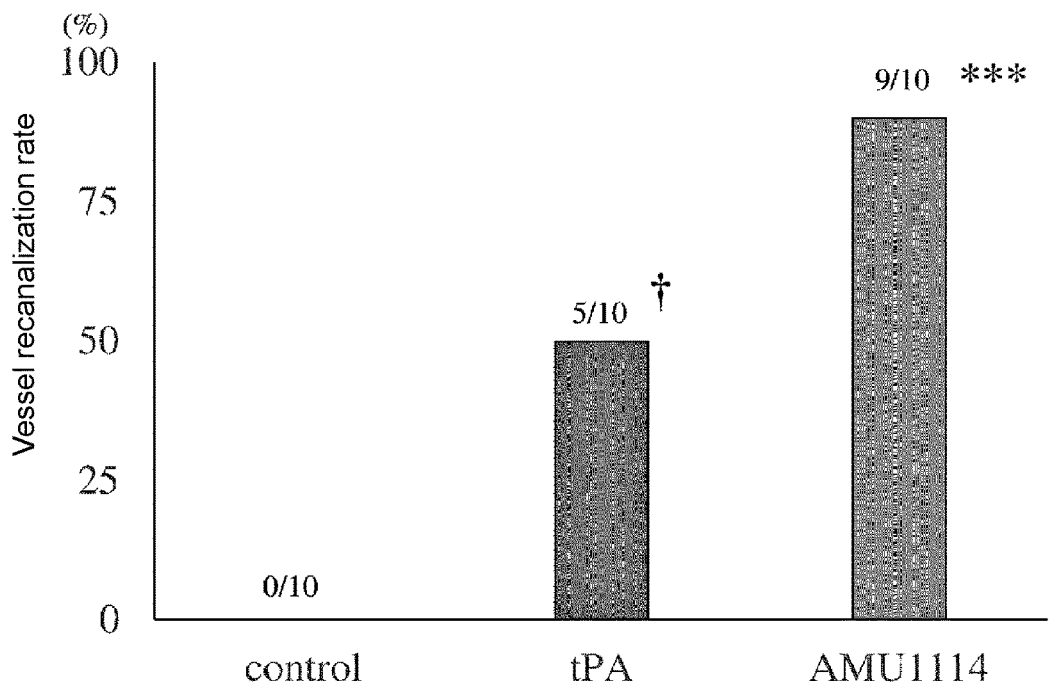
FIG. 5D is a graph showing the blood-vessel recanalization rate of the cases shown in FIG. 5A to FIG. 5C, after completion of observation (60 minutes after administration of rose bengal and 55 minutes after administration of a drug). †, $p<0.05$: having a significant difference from a negative control (Fisher's exact test); ***, $p<0.001$: having a significant difference from a negative control (Fisher's exact test).

When the results of FIG. 5B are compared to those of FIG. 5C, recanalization was observed in a larger number of individuals in the AMU1114 administration group than in the Activacin administration group, as shown in FIG. 5D. It was demonstrated that AMU1114 is more excellent in recanalization than conventional thrombolytic drugs (particularly, t-PA), in-vivo. In consideration that the drugs were administered in the doses at which the same activity is produced in vitro, the ability of AMU1114 administration group to recanalize the blood vessel in-vivo was as high as beyond expectation.

Figure 6:
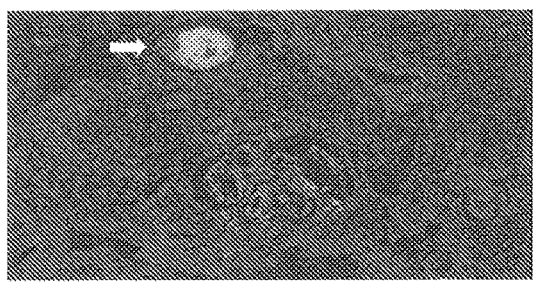
FIG. 6 shows immunohistochemical staining images of blood clots, which were happened to find in the blood vessel in normal tissue portion of a human lung cancer resected specimen, with humanized 1101 antibody and humanized 99 antibody.
Figure 6:
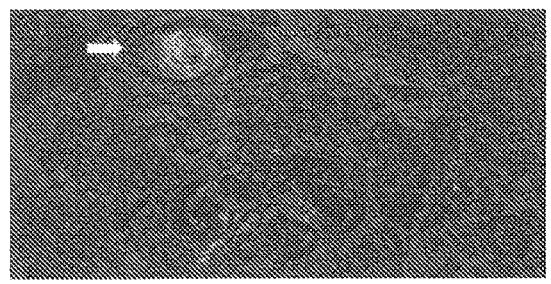
Figure 6:
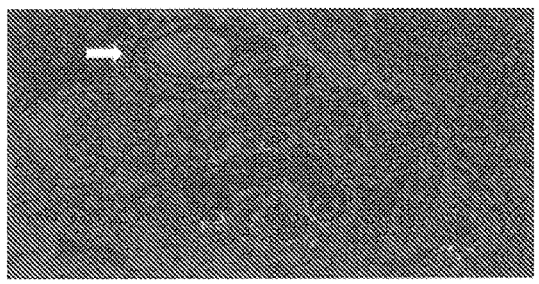
Figure 6:
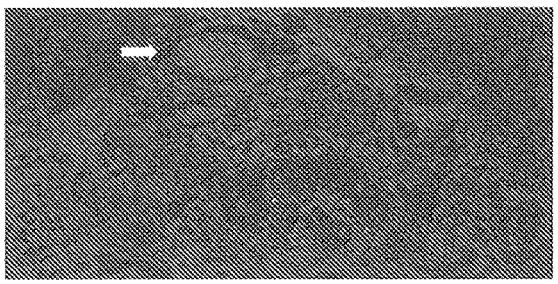

In the blood vessel of the normal tissue part in a human lung cancer resected specimen, a site where blood clots are present was found. The blood clots were immunohistochemically stained with humanized 1101 antibody and humanized 99 antibody in the same manner as above. The results are shown in FIG. 6. As is apparent from FIG. 6, blood clot sites were respectively visualized with humanized 1101 antibody and humanized 99 antibody. In other words, it was found that humanized 1101 antibody and humanized 99 antibody bind to human blood clots.

SEQUENCE LISTING

SEQ ID NO:1: Example of amino acid sequence of prourokinase (signal peptide has been removed)
SEQ ID NO:2: Example of amino acid sequence of a prourokinase mutant (signal peptide has been removed)
SEQ ID NO:3: Example of fusion protein of a heavy chain Fab region of anti-fibrin antibody 1101 clone and a prourokinase mutant (His tag is not contained)
SEQ ID NO:4: Amino acid sequence of light chain of anti-fibrin antibody 1101 clone (herein, an amino acid sequence at positions 1 to 22 is a signal sequence; an amino acid sequence consisting of 23 to 130th amino acids is the amino acid sequence of light chain variable region of the antibody; an amino acid sequence at positions 131 to 236 is the amino acid sequence of a light chain constant region of the antibody)
SEQ ID NO:5: Amino acid sequence of heavy chain Fab region of anti-fibrin antibody 1101 clone (herein, amino acid sequence at positions 1 to 19 is a signal sequence; an amino acid sequence at positions 20 to 139 is the amino acid sequence of heavy chain variable region of the antibody; amino acid sequence at positions 140 to 242 is the amino acid sequence of a heavy chain constant region contained in Fab)
SEQ ID NO:6: Nucleotide sequence of primer 1
SEQ ID NO:7: Nucleotide sequence of primer 2
SEQ ID NO:8: Nucleotide sequence of primer 3
SEQ ID NO:9: Nucleotide sequence of primer 4
SEQ ID NO:10: Nucleotide sequence of primer 5
SEQ ID NO:11: Amino acid sequence of heavy chain CDR1 of humanized anti-fibrin antibody 1101 clone to be used in a fusion protein of the present invention
SEQ ID NO:12: Amino acid sequence of heavy chain CDR2 of humanized anti-fibrin antibody 1101 clone to be used in a fusion protein of the present invention
SEQ ID NO:13: Amino acid sequence of heavy chain CDR3 of humanized anti-fibrin antibody 1101 clone to be used in a fusion protein of the present invention
SEQ ID NO:14: Amino acid sequence of light chain CDR1 of humanized anti-fibrin antibody 1101 clone to be used in a fusion protein of the present invention
SEQ ID NO:15: Amino acid sequence of light chain CDR2 of humanized anti-fibrin antibody 1101 clone to be used in a fusion protein of the present invention
SEQ ID NO:16: Amino acid sequence of light chain CDR3 of humanized anti-fibrin antibody 1101 clone to be used in a fusion protein of the present invention
SEQ ID NO:17: Example of amino acid sequence of exposed in insoluble fibrin (β chain)
SEQ ID NO:18: Example of amino acid sequence of exposed in insoluble fibrin (γ chain)
SEQ ID NO:19: Sequence of a linker used in Examples

The invention claimed is:

1. A fusion protein comprising an antibody that binds to insoluble fibrin or an antigen-binding fragment thereof and a prourokinase mutant comprising a catalytic domain of prourokinase, wherein the antibody or the antigen-binding fragment thereof and the prourokinase mutant are linked directly or via a linker to each other, wherein the insoluble fibrin antibody or the antigen-binding fragment thereof comprises:
   a heavy chain variable region comprising a heavy chain CDR1 comprising the amino acid sequence of SEQ ID NO:11, a heavy chain CDR2 comprising the amino acid sequence of SEQ ID NO:12, and a heavy chain CDR3 comprising the amino acid sequence of SEQ ID NO:13; and
   a light chain variable region comprising a light chain CDR1 comprising the amino acid sequence of SEQ ID NO:14, a light chain CDR2 comprising the amino acid sequence of SEQ ID NO:15, and a light chain CDR3 comprising the amino acid sequence of SEQ ID NO:16.

2. The fusion protein according to claim 1, wherein the linker is a non-cleavable linker.

3. The fusion protein according to claim 1, wherein the linker is a peptide linker.

4. The fusion protein according to claim 1, wherein the prourokinase mutant further comprises a kringle domain, wherein the kringle domain and the catalytic domain of the prourokinase mutant are linked to each other in the order: kringle domain, catalytic domain.

5. The fusion protein according to claim 4, wherein the prourokinase mutant further comprises an EGF-like domain, wherein the EGF-like domain, the kringle domain, and the catalytic domain of the prourokinase mutant are linked to each other in the order: EGF-like domain, kringle domain, and catalytic domain.

6. The fusion protein according to claim 1, wherein the catalytic domain is of a prourokinase mutant comprising an amino acid sequence having at least 90% sequence identity to SEQ ID NO:2.

7. A pharmaceutical composition comprising the fusion protein according to claim 1.

8. A method for dissolving a fibrin clot in a subject, the method comprising administering the pharmaceutical composition according to claim 7 to the subject.

9. The method of claim 8, wherein the subject has a disease selected from cerebrovascular disorder and myocardial infarction.

* * * * *

SEQUENCE LISTING

<160> NUMBER OF SEQ ID NOS: 19

<210> SEQ ID NO 1
<211> LENGTH: 411
<212> TYPE: PRT
<213> ORGANISM: Homo sapiens

<400> SEQUENCE: 1

```
Ser Asn Glu Leu His Gln Val Pro Ser Asn Cys Asp Cys Leu Asn Gly
1               5                   10                  15

Gly Thr Cys Val Ser Asn Lys Tyr Phe Ser Asn Ile His Trp Cys Asn
            20                  25                  30

Cys Pro Lys Lys Phe Gly Gly Gln His Cys Glu Ile Asp Lys Ser Lys
        35                  40                  45

Thr Cys Tyr Glu Gly Asn Gly His Phe Tyr Arg Gly Lys Ala Ser Thr
    50                  55                  60

Asp Thr Met Gly Arg Pro Cys Leu Pro Trp Asn Ser Ala Thr Val Leu
65                  70                  75                  80

Gln Gln Thr Tyr His Ala His Arg Ser Asp Ala Leu Gln Leu Gly Leu
                85                  90                  95
```

Gly Lys His Asn Tyr Cys Arg Asn Pro Asp Asn Arg Arg Pro Trp
            100                 105                 110

Cys Tyr Val Gln Val Gly Leu Lys Pro Leu Val Gln Glu Cys Met Val
        115                 120                 125

His Asp Cys Ala Asp Gly Lys Lys Pro Ser Ser Pro Pro Glu Glu Leu
    130                 135                 140

Lys Phe Gln Cys Gly Gln Lys Thr Leu Arg Pro Arg Phe Lys Ile Ile
145                 150                 155                 160

Gly Gly Glu Phe Thr Thr Ile Glu Asn Gln Pro Trp Phe Ala Ala Ile
                165                 170                 175

Tyr Arg Arg His Arg Gly Gly Ser Val Thr Tyr Val Cys Gly Gly Ser
            180                 185                 190

Leu Ile Ser Pro Cys Trp Val Ile Ser Ala Thr His Cys Phe Ile Asp
        195                 200                 205

Tyr Pro Lys Lys Glu Asp Tyr Ile Val Tyr Leu Gly Arg Ser Arg Leu
    210                 215                 220

Asn Ser Asn Thr Gln Gly Glu Met Lys Phe Glu Val Glu Asn Leu Ile
225                 230                 235                 240

Leu His Lys Asp Tyr Ser Ala Asp Thr Leu Ala His His Asn Asp Ile
                245                 250                 255

Ala Leu Leu Lys Ile Arg Ser Lys Glu Gly Arg Cys Ala Gln Pro Ser
            260                 265                 270

Arg Thr Ile Gln Thr Ile Cys Leu Pro Ser Met Tyr Asn Asp Pro Gln
        275                 280                 285

Phe Gly Thr Ser Cys Glu Ile Thr Gly Phe Gly Lys Glu Asn Ser Thr
    290                 295                 300

Asp Tyr Leu Tyr Pro Glu Gln Leu Lys Met Thr Val Val Lys Leu Ile
305                 310                 315                 320

Ser His Arg Glu Cys Gln Gln Pro His Tyr Tyr Gly Ser Glu Val Thr
                325                 330                 335

Thr Lys Met Leu Cys Ala Ala Asp Pro Gln Trp Lys Thr Asp Ser Cys
            340                 345                 350

Gln Gly Asp Ser Gly Gly Pro Leu Val Cys Ser Leu Gln Gly Arg Met
        355                 360                 365

Thr Leu Thr Gly Ile Val Ser Trp Gly Arg Gly Cys Ala Leu Lys Asp
    370                 375                 380

Lys Pro Gly Val Tyr Thr Arg Val Ser His Phe Leu Pro Trp Ile Arg
385                 390                 395                 400

Ser His Thr Lys Glu Glu Asn Gly Leu Ala Leu
                405                 410

<210> SEQ ID NO 2
<211> LENGTH: 411
<212> TYPE: PRT
<213> ORGANISM: Artificial Sequence
<220> FEATURE:
<223> OTHER INFORMATION: Human pro-urokinase mutant K135G, K136G

<400> SEQUENCE: 2

Ser Asn Glu Leu His Gln Val Pro Ser Asn Cys Asp Cys Leu Asn Gly
1               5                   10                  15

Gly Thr Cys Val Ser Asn Lys Tyr Phe Ser Asn Ile His Trp Cys Asn
            20                  25                  30

Cys Pro Lys Lys Phe Gly Gly Gln His Cys Glu Ile Asp Lys Ser Lys
        35                  40                  45

```
Thr Cys Tyr Glu Gly Asn Gly His Phe Tyr Arg Gly Lys Ala Ser Thr
     50                  55                  60

Asp Thr Met Gly Arg Pro Cys Leu Pro Trp Asn Ser Ala Thr Val Leu
 65              70                  75                  80

Gln Gln Thr Tyr His Ala His Arg Ser Asp Ala Leu Gln Leu Gly Leu
                 85                  90                  95

Gly Lys His Asn Tyr Cys Arg Asn Pro Asp Asn Arg Arg Arg Pro Trp
             100                 105                 110

Cys Tyr Val Gln Val Gly Leu Lys Pro Leu Val Gln Glu Cys Met Val
             115                 120                 125

His Asp Cys Ala Asp Gly Gly Pro Ser Ser Pro Glu Glu Leu
             130                 135                 140

Lys Phe Gln Cys Gly Gln Lys Thr Leu Arg Pro Arg Phe Lys Ile Ile
145             150                 155                 160

Gly Gly Glu Phe Thr Thr Ile Glu Asn Gln Pro Trp Phe Ala Ala Ile
                 165                 170                 175

Tyr Arg Arg His Arg Gly Gly Ser Val Thr Tyr Val Cys Gly Gly Ser
             180                 185                 190

Leu Ile Ser Pro Cys Trp Val Ile Ser Ala Thr His Cys Phe Ile Asp
         195                 200                 205

Tyr Pro Lys Lys Glu Asp Tyr Ile Val Tyr Leu Gly Arg Ser Arg Leu
     210                 215                 220

Asn Ser Asn Thr Gln Gly Glu Met Lys Phe Glu Val Glu Asn Leu Ile
225                 230                 235                 240

Leu His Lys Asp Tyr Ser Ala Asp Thr Leu Ala His His Asn Asp Ile
                 245                 250                 255

Ala Leu Leu Lys Ile Arg Ser Lys Glu Gly Arg Cys Ala Gln Pro Ser
             260                 265                 270

Arg Thr Ile Gln Thr Ile Cys Leu Pro Ser Met Tyr Asn Asp Pro Gln
         275                 280                 285

Phe Gly Thr Ser Cys Glu Ile Thr Gly Phe Gly Lys Glu Asn Ser Thr
     290                 295                 300

Asp Tyr Leu Tyr Pro Glu Gln Leu Lys Met Thr Val Val Lys Leu Ile
305                 310                 315                 320

Ser His Arg Glu Cys Gln Gln Pro His Tyr Tyr Gly Ser Glu Val Thr
                 325                 330                 335

Thr Lys Met Leu Cys Ala Ala Asp Pro Gln Trp Lys Thr Asp Ser Cys
             340                 345                 350

Gln Gly Asp Ser Gly Gly Pro Leu Val Cys Ser Leu Gln Gly Arg Met
         355                 360                 365

Thr Leu Thr Gly Ile Val Ser Trp Gly Arg Gly Cys Ala Leu Lys Asp
     370                 375                 380

Lys Pro Gly Val Tyr Thr Arg Val Ser His Phe Leu Pro Trp Ile Arg
385                 390                 395                 400

Ser His Thr Lys Glu Glu Asn Gly Leu Ala Leu
                 405                 410
```

<210> SEQ ID NO 3
<211> LENGTH: 675
<212> TYPE: PRT
<213> ORGANISM: Artificial Sequence
<220> FEATURE:
<223> OTHER INFORMATION: Fusion protein of pro-urokinase mutant and Fab
      region of heavy chain of anti-fibrin antibody 1101 clone

<400> SEQUENCE: 3

```
Met Gly Ser Thr Ala Ile Leu Ala Leu Leu Ala Val Leu Gln Gly
1               5                   10                  15

Val Cys Ala Glu Val Gln Leu Val Gln Ser Gly Ala Glu Val Lys Lys
            20                  25                  30

Pro Gly Glu Ser Leu Lys Ile Ser Cys Lys Gly Ser Gly Tyr Ser Phe
            35                  40                  45

Thr Ser Tyr Trp Met His Trp Val Arg Gln Met Pro Gly Lys Gly Leu
    50                  55                  60

Glu Trp Ile Gly Ala Ile Tyr Pro Gly Asn Ser Asp Thr Arg Tyr Ser
65                  70                  75                  80

Pro Ser Phe Gln Gly Gln Val Thr Ile Ser Ala Asp Lys Ser Ile Ser
                85                  90                  95

Thr Ala Tyr Leu Gln Trp Ser Ser Leu Lys Ala Ser Asp Thr Ala Met
                100                 105                 110

Tyr Tyr Cys Thr Arg Lys Ala His Tyr Gly Asn Tyr Gly Phe Ala Tyr
            115                 120                 125

Trp Gly Gln Gly Thr Leu Val Thr Val Ser Ser Ala Ser Thr Lys Gly
    130                 135                 140

Pro Ser Val Phe Pro Leu Ala Pro Ser Ser Lys Ser Thr Ser Gly Gly
145                 150                 155                 160

Thr Ala Ala Leu Gly Cys Leu Val Lys Asp Tyr Phe Pro Glu Pro Val
                165                 170                 175

Thr Val Ser Trp Asn Ser Gly Ala Leu Thr Ser Gly Val His Thr Phe
                180                 185                 190

Pro Ala Val Leu Gln Ser Ser Gly Leu Tyr Ser Leu Ser Ser Val Val
            195                 200                 205

Thr Val Pro Ser Ser Ser Leu Gly Thr Gln Thr Tyr Ile Cys Asn Val
    210                 215                 220

Asn His Lys Pro Ser Asn Thr Lys Val Asp Lys Lys Val Glu Pro Lys
225                 230                 235                 240

Ser Cys Gly Ser Gly Gly Gly Ser Gly Gly Gly Gly Ser Gly Gly
                245                 250                 255

Ser Ser Ser Asn Glu Leu His Gln Val Pro Ser Asn Cys Asp Cys Leu
            260                 265                 270

Asn Gly Gly Thr Cys Val Ser Asn Lys Tyr Phe Ser Asn Ile His Trp
    275                 280                 285

Cys Asn Cys Pro Lys Lys Phe Gly Gly Gln His Cys Glu Ile Asp Lys
    290                 295                 300

Ser Lys Thr Cys Tyr Glu Gly Asn Gly His Phe Tyr Arg Gly Lys Ala
305                 310                 315                 320

Ser Thr Asp Thr Met Gly Arg Pro Cys Leu Pro Trp Asn Ser Ala Thr
                325                 330                 335

Val Leu Gln Gln Thr Tyr His Ala His Arg Ser Asp Ala Leu Gln Leu
            340                 345                 350

Gly Leu Gly Lys His Asn Tyr Cys Arg Asn Pro Asp Asn Arg Arg Arg
    355                 360                 365

Pro Trp Cys Tyr Val Gln Val Gly Leu Lys Pro Leu Val Gln Glu Cys
    370                 375                 380

Met Val His Asp Cys Ala Asp Gly Gly Pro Ser Ser Pro Glu
385                 390                 395                 400

Glu Leu Lys Phe Gln Cys Gly Gln Lys Thr Leu Arg Pro Arg Phe Lys
                405                 410                 415
```

```
Ile Ile Gly Gly Glu Phe Thr Thr Ile Glu Asn Gln Pro Trp Phe Ala
            420                 425                 430

Ala Ile Tyr Arg Arg His Arg Gly Gly Ser Val Thr Tyr Val Cys Gly
            435                 440                 445

Gly Ser Leu Ile Ser Pro Cys Trp Val Ile Ser Ala Thr His Cys Phe
            450                 455                 460

Ile Asp Tyr Pro Lys Lys Glu Asp Tyr Ile Val Tyr Leu Gly Arg Ser
465                 470                 475                 480

Arg Leu Asn Ser Asn Thr Gln Gly Glu Met Lys Phe Glu Val Glu Asn
            485                 490                 495

Leu Ile Leu His Lys Asp Tyr Ser Ala Asp Thr Leu Ala His His Asn
            500                 505                 510

Asp Ile Ala Leu Leu Lys Ile Arg Ser Lys Glu Gly Arg Cys Ala Gln
            515                 520                 525

Pro Ser Arg Thr Ile Gln Thr Ile Cys Leu Pro Ser Met Tyr Asn Asp
            530                 535                 540

Pro Gln Phe Gly Thr Ser Cys Glu Ile Thr Gly Phe Gly Lys Glu Asn
545                 550                 555                 560

Ser Thr Asp Tyr Leu Tyr Pro Glu Gln Leu Lys Met Thr Val Val Lys
                565                 570                 575

Leu Ile Ser His Arg Glu Cys Gln Gln Pro His Tyr Tyr Gly Ser Glu
            580                 585                 590

Val Thr Thr Lys Met Leu Cys Ala Ala Asp Pro Gln Trp Lys Thr Asp
            595                 600                 605

Ser Cys Gln Gly Asp Ser Gly Gly Pro Leu Val Cys Ser Leu Gln Gly
610                 615                 620

Arg Met Thr Leu Thr Gly Ile Val Ser Trp Gly Arg Gly Cys Ala Leu
625                 630                 635                 640

Lys Asp Lys Pro Gly Val Tyr Thr Arg Val Ser His Phe Leu Pro Trp
                645                 650                 655

Ile Arg Ser His Thr Lys Glu Glu Asn Gly Leu Ala Leu Ser Ala Gly
            660                 665                 670

Gly Ala Ser
        675

<210> SEQ ID NO 4
<211> LENGTH: 236
<212> TYPE: PRT
<213> ORGANISM: Artificial Sequence
<220> FEATURE:
<223> OTHER INFORMATION: Light chain of humanized 1101 clone

<400> SEQUENCE: 4

Met Asp Met Arg Val Pro Ala Gln Leu Leu Gly Leu Leu Leu Leu Trp
1               5                   10                  15

Leu Arg Gly Ala Arg Cys Asp Ile Gln Met Thr Gln Ser Pro Ser Ser
            20                  25                  30

Leu Ser Ala Ser Val Gly Asp Arg Val Thr Ile Thr Cys Arg Ala Ser
            35                  40                  45

Gln His Ile Asn Asn Trp Leu Ala Trp Tyr Gln Gln Lys Pro Gly Lys
        50                  55                  60

Ala Pro Lys Leu Leu Ile Ser Gly Ala Thr Ser Leu Gln Ser Gly Val
65                  70                  75                  80

Pro Ser Arg Phe Ser Gly Ser Gly Ser Gly Thr Asp Phe Thr Leu Thr
                85                  90                  95
```

```
Ile Ser Ser Leu Gln Pro Glu Asp Phe Ala Thr Tyr Tyr Cys Gln Gln
            100                 105                 110

Tyr Trp Ser Thr Pro Leu Thr Phe Gly Gln Gly Thr Lys Val Glu Ile
        115                 120                 125

Lys Arg Thr Val Ala Ala Pro Ser Val Phe Ile Phe Pro Pro Ser Asp
    130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190

Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235

<210> SEQ ID NO 5
<211> LENGTH: 242
<212> TYPE: PRT
<213> ORGANISM: Artificial Sequence
<220> FEATURE:
<223> OTHER INFORMATION: Fab region of heavy chain of humanized 1101
      clone

<400> SEQUENCE: 5

Met Gly Ser Thr Ala Ile Leu Ala Leu Leu Ala Val Leu Gln Gly
1               5                   10                  15

Val Cys Ala Glu Val Gln Leu Val Gln Ser Gly Ala Glu Val Lys Lys
            20                  25                  30

Pro Gly Glu Ser Leu Lys Ile Ser Cys Lys Gly Ser Gly Tyr Ser Phe
        35                  40                  45

Thr Ser Tyr Trp Met His Trp Val Arg Gln Met Pro Gly Lys Gly Leu
    50                  55                  60

Glu Trp Ile Gly Ala Ile Tyr Pro Gly Asn Ser Asp Thr Arg Tyr Ser
65                  70                  75                  80

Pro Ser Phe Gln Gly Gln Val Thr Ile Ser Ala Asp Lys Ser Ile Ser
                85                  90                  95

Thr Ala Tyr Leu Gln Trp Ser Ser Leu Lys Ala Ser Asp Thr Ala Met
            100                 105                 110

Tyr Tyr Cys Thr Arg Lys Ala His Tyr Gly Asn Tyr Gly Phe Ala Tyr
        115                 120                 125

Trp Gly Gln Gly Thr Leu Val Thr Val Ser Ser Ala Ser Thr Lys Gly
    130                 135                 140

Pro Ser Val Phe Pro Leu Ala Pro Ser Ser Lys Ser Thr Ser Gly Gly
145                 150                 155                 160

Thr Ala Ala Leu Gly Cys Leu Val Lys Asp Tyr Phe Pro Glu Pro Val
                165                 170                 175

Thr Val Ser Trp Asn Ser Gly Ala Leu Thr Ser Gly Val His Thr Phe
            180                 185                 190

Pro Ala Val Leu Gln Ser Ser Gly Leu Tyr Ser Leu Ser Ser Val Val
        195                 200                 205

Thr Val Pro Ser Ser Ser Leu Gly Thr Gln Thr Tyr Ile Cys Asn Val
    210                 215                 220
```

Asn His Lys Pro Ser Asn Thr Lys Val Asp Lys Lys Val Glu Pro Lys
225                 230                 235                 240

Ser Cys

<210> SEQ ID NO 6
<211> LENGTH: 41
<212> TYPE: DNA
<213> ORGANISM: Artificial Sequence
<220> FEATURE:
<223> OTHER INFORMATION: Primer 1

<400> SEQUENCE: 6
acttgaattc caccatgggc tctacagcaa tcctcgcttt g         41

<210> SEQ ID NO 7
<211> LENGTH: 38
<212> TYPE: DNA
<213> ORGANISM: Artificial Sequence
<220> FEATURE:
<223> OTHER INFORMATION: Primer 2

<400> SEQUENCE: 7
ataaggatcc tttacccgga gacagggaga ggctcttc              38

<210> SEQ ID NO 8
<211> LENGTH: 32
<212> TYPE: DNA
<213> ORGANISM: Artificial Sequence
<220> FEATURE:
<223> OTHER INFORMATION: Primer 3

<400> SEQUENCE: 8
gaggctcgag tcttaagttt caatgcggcc ag                    32

<210> SEQ ID NO 9
<211> LENGTH: 78
<212> TYPE: DNA
<213> ORGANISM: Artificial Sequence
<220> FEATURE:
<223> OTHER INFORMATION: Primer 4

<400> SEQUENCE: 9
ataagcggcc gctcaatggt ggtggtggtg atgatggtga cttgctccgc ctgcggaaag    60
cgccagacca ttttcttc                                                  78

<210> SEQ ID NO 10
<211> LENGTH: 102
<212> TYPE: DNA
<213> ORGANISM: Artificial Sequence
<220> FEATURE:
<223> OTHER INFORMATION: Primer 5

<400> SEQUENCE: 10
gaagagcctc tccctgtctc cgggtaaagg atccggtgga ggtggcagtg gtggggagg     60 ctcaggaggc tcgagtctta agtttcaatg cggccagaaa ac                      102

<210> SEQ ID NO 11
<211> LENGTH: 5
<212> TYPE: PRT
<213> ORGANISM: Artificial Sequence
<220> FEATURE:
<223> OTHER INFORMATION: HCDR1 of humanized 1101 clone

<400> SEQUENCE: 11

```
Ser Tyr Trp Met His
1               5

<210> SEQ ID NO 12
<211> LENGTH: 17
<212> TYPE: PRT
<213> ORGANISM: Artificial Sequence
<220> FEATURE:
<223> OTHER INFORMATION: HCDR2 of humanized 1101 clone

<400> SEQUENCE: 12

Ala Ile Tyr Pro Gly Asn Ser Asp Thr Arg Tyr Ser Pro Ser Phe Gln
1               5                   10                  15

Gly

<210> SEQ ID NO 13
<211> LENGTH: 11
<212> TYPE: PRT
<213> ORGANISM: Artificial Sequence
<220> FEATURE:
<223> OTHER INFORMATION: HCDR3 of humanized 1101 clone

<400> SEQUENCE: 13

Lys Ala His Tyr Gly Asn Tyr Gly Phe Ala Tyr
1               5                   10

<210> SEQ ID NO 14
<211> LENGTH: 11
<212> TYPE: PRT
<213> ORGANISM: Artificial Sequence
<220> FEATURE:
<223> OTHER INFORMATION: LCDR1 of humanized 1101 clone

<400> SEQUENCE: 14

Arg Ala Ser Gln His Ile Asn Asn Trp Leu Ala
1               5                   10

<210> SEQ ID NO 15
<211> LENGTH: 7
<212> TYPE: PRT
<213> ORGANISM: Artificial Sequence
<220> FEATURE:
<223> OTHER INFORMATION: LCDR2 of humanized 1101 clone

<400> SEQUENCE: 15

Gly Ala Thr Ser Leu Gln Ser
1               5

<210> SEQ ID NO 16
<211> LENGTH: 9
<212> TYPE: PRT
<213> ORGANISM: Artificial Sequence
<220> FEATURE:
<223> OTHER INFORMATION: LCDR3 of humanized 1101 clone

<400> SEQUENCE: 16

Gln Gln Tyr Trp Ser Thr Pro Leu Thr
1               5

<210> SEQ ID NO 17
<211> LENGTH: 16
<212> TYPE: PRT
<213> ORGANISM: Artificial Sequence
<220> FEATURE:
<223> OTHER INFORMATION: Fibrinogen Bbeta 231-246
```

-continued

```
<400> SEQUENCE: 17

Cys Asn Ile Pro Val Val Ser Gly Lys Glu Cys Glu Glu Ile Ile Arg
1               5                   10                  15

<210> SEQ ID NO 18
<211> LENGTH: 15
<212> TYPE: PRT
<213> ORGANISM: Artificial Sequence
<220> FEATURE:
<223> OTHER INFORMATION: Fibrinogen gamma 232-246

<400> SEQUENCE: 18

Lys Asn Trp Ile Gln Tyr Lys Glu Gly Phe Gly His Leu Ser Pro
1               5                   10                  15

<210> SEQ ID NO 19
<211> LENGTH: 16
<212> TYPE: PRT
<213> ORGANISM: Artificial Sequence
<220> FEATURE:
<223> OTHER INFORMATION: linker used in Examples

<400> SEQUENCE: 19

Gly Ser Gly Gly Gly Gly Ser Gly Gly Gly Gly Ser Gly Gly Ser Ser
1               5                   10                  15
```